United States Patent
Nakao et al.

(10) Patent No.: US 10,839,601 B2
(45) Date of Patent: Nov. 17, 2020

(54) INFORMATION PROCESSING DEVICE, INFORMATION PROCESSING METHOD, AND PROGRAM

(71) Applicant: Sony Corporation, Tokyo (JP)

(72) Inventors: Yuta Nakao, Kanagawa (JP); Yuki Ono, Kanagawa (JP); Daisuke Tahara, Tokyo (JP)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 16/087,420

(22) PCT Filed: Feb. 23, 2017

(86) PCT No.: PCT/JP2017/006885
§ 371 (c)(1),
(2) Date: Sep. 21, 2018

(87) PCT Pub. No.: WO2017/169369
PCT Pub. Date: Oct. 5, 2017

(65) Prior Publication Data
US 2019/0102940 A1    Apr. 4, 2019

(30) Foreign Application Priority Data
Mar. 31, 2016 (JP) ................. 2016-070604

(51) Int. Cl.
*G06T 19/00* (2011.01)
*G06T 13/80* (2011.01)
(Continued)

(52) U.S. Cl.
CPC .............. *G06T 19/003* (2013.01); *G06T 1/00* (2013.01); *G06T 13/80* (2013.01); *G06T 15/20* (2013.01);
(Continued)

(58) Field of Classification Search
CPC ......... G06T 19/003; G06T 15/20; G06T 1/00; G06T 13/80; G06T 19/00;
(Continued)

(56) References Cited

U.S. PATENT DOCUMENTS 6,256,061 B1    7/2001 Martiin et al.
2010/0066745 A1*    3/2010 Tsuda ................. G06K 9/00228
345/473

(Continued)

FOREIGN PATENT DOCUMENTS

JP    2013-239986 A    11/2013
JP    2014-220724 A    11/2014
WO    2014/181529 A1    11/2014

OTHER PUBLICATIONS

Partial Supplementary European Search Report dated Feb. 28, 2019 for corresponding European Application No. 17773914.1.
(Continued)

*Primary Examiner* — Xilin Guo
(74) *Attorney, Agent, or Firm* — Michael Best & Friedrich LLP

(57) ABSTRACT

In an image including a continuous visual field of 360 degrees, such as a celestial sphere image, in a case where a partial region is displayed as an output target region, transition from a certain output target region to the other output target region is realized smoothly and with natural feeling, without having visually uncomfortable feeling. For this reason, a transition source output target region and a transition destination output target region are specified, in an output target region which is a partial region of the entire image, which is an image having a continuous visual field of 360 degrees in at least one direction. Then, a visual field transition path from the specified transition source output
(Continued)

A

B target region to the specified transition destination output target region is automatically determined.

20 Claims, 24 Drawing Sheets

(51) Int. Cl.
*G06T 1/00* (2006.01)
*H04N 5/232* (2006.01)
*G06T 15/20* (2011.01)
*H04N 5/272* (2006.01)

(52) U.S. Cl.
CPC ..... *H04N 5/23218* (2018.08); *H04N 5/23238* (2013.01); *H04N 5/272* (2013.01)

(58) Field of Classification Search
CPC . G06T 2207/10016; G06T 3/40; G06T 15/00; G06T 17/00; H04N 5/23218; H04N 5/23238; H04N 5/272; H04N 5/232; H04N 19/176; H04N 13/363; H04N 2013/405; H04N 13/332; H04N 5/7491; H04M 19/041; H04M 1/72555; H04M 1/0266; H04M 2250/52; G06F 3/04815

See application file for complete search history.

(56) References Cited

U.S. PATENT DOCUMENTS

| | | | |
|---|---|---|---|
| 2013/0222283 A1* | 8/2013 | Yun | G06F 3/0483 345/173 |
| 2013/0266065 A1* | 10/2013 | Paczkowski | H04N 21/4728 375/240.12 |
| 2015/0271402 A1* | 9/2015 | Guo | H04N 5/23293 348/39 |
| 2016/0080650 A1 | 3/2016 | Okazawa et al. | |
| 2017/0308771 A1* | 10/2017 | Shimauchi | G06K 9/00765 |

OTHER PUBLICATIONS

Extended European Search Report dated Jun. 3, 2019 for corresponding European Application No. 17773914.1.

* cited by examiner

A

B

A

B

INFORMATION PROCESSING DEVICE, INFORMATION PROCESSING METHOD, AND PROGRAM

TECHNICAL FIELD

The present technology relates to an information processing device, an information processing method, and a program, and in particular, relates to a technology used at the time of displaying a partial region as an output target region with respect to an image having a continuous visual field of 360 degrees.

BACKGROUND ART

In image contents as a still image or a moving image captured by an image pickup device, image contents produced by computer graphics, or the like, an image having a continuous visual field of 360 degrees has been known. Examples of the image contents include a so-called celestial sphere image, a half celestial sphere image, a panorama image of 360 degrees, and the like.

In a case where such an image having a continuous visual field of 360 degrees is displayed on a display device, a part of the entire image is cut out as an output target region and is displayed.

In Patent Literature 1, it is described that a part of the entire image is cut out and is displayed such that a specific subject is tracked, at the time of viewing an image having a wide field angle, for example, a celestial sphere image or the like.

CITATION LIST

Patent Literature

Patent Literature 1: JP-A-2014-220724

DISCLOSURE OF INVENTION

Technical Problem

However, in the celestial sphere image or the like, when a display image is transitioned to the other output target region at the time of displaying a part of the output target region, it is required to perform transition desirable for an audience. This is because in a case where the output target region is needlessly changed on the display when the audience views a part of an image cut out from the image celestial sphere image or the like, the audience may feel that the image is an unnatural image or an image having an uncomfortable feeling on the behavior of the subject.

Therefore, an object of the present technology is to provide an image which is comfortable and is easily visible for an audience, and is not unnatural, even at the time of transitioning an output target region.

Solution to Problem

An information processing device according to the present technology, includes: a specification unit that specifies a transition source output target region and a transition destination output target region, as an output target region which is a partial region of an entire image, which is an image including a continuous visual field of 360 degrees in at least one direction; and a visual field transition path determination unit that automatically determines a visual field transition path from the transition source output target region to the transition destination output target region.

In the transition of the output target region imitating a viewpoint movement of an audience (a region cut out from the entire image, and is set to a display target), in a case of assuming a transition source and a transition destination in the entire continuous image of 360 degrees, the visual field transition path from the transition source output target region to the transition destination output target region as a continuous image can be variously considered, and thus, the visual field transition path is automatically determined.

Note that, the entire image is an image including at least a continuous portion of 360 degrees, such as a celestial sphere image, a half celestial sphere image, and a panorama image of 360 degrees. In other words, the entire image is an image having a visual field of 360 degrees.

In the information processing device according to the present technology described above, it is considered that the visual field transition path determination unit determines one of a candidate path progressing to one direction from the transition source output target region towards the transition destination output target region, and a candidate path progressing to a direction opposite to the one direction, as the visual field transition path.

In the transition of the output target region, in a case of assuming the transition source and the transition destination in the entire continuous image of 360 degrees, a plurality of paths transitioned from the transition source to the transition destination as the continuous image are assumed. In particular, in consideration of a position relationship between the transition source and the transition destination in the entire continuous image of 360 degrees, it is considered that the transition from the transition source to the transition destination (the viewpoint movement) is in a direction opposite to one direction on a circumference of 360 degrees of the entire image. One of the plurality of paths is set to be automatically selected. Therefore, in the candidate path progressing to one direction and the candidate path progressing to the direction opposite to one direction, for example, a visually desired path is automatically determined as the visual field transition path.

In the information processing device according to the present technology described above, it is considered that the visual field transition path determination unit uses movement distance information indicating a movement distance from the transition source output target region to the transition destination output target region for each of a plurality of candidate paths, in order to determine the visual field transition path.

For example, a candidate path having a shorter movement distance is selected as the visual field transition path.

In the information processing device according to the present technology described above, it is considered that the entire image is a moving image, and the visual field transition path determination unit uses movement direction information indicating a movement direction in the entire image of a subject existing in the transition source output target region on progress of the moving image, in order to determine the visual field transition path.

That is, in the transition source output target region, in a case where a movable body other than a figure to be the subject, is moved in a certain direction on the moving image, the movement direction is one factor for determining the visual field transition path.

In the information processing device according to the present technology described above, it is considered that the entire image is a moving image, and the visual field transition path determination unit uses movement direction information indicating a movement direction in the entire image of a subject existing in the transition destination output target region on progress of the moving image, in order to determine the visual field transition path.

That is, in the transition destination output target region, in a case where the movable body other than the figure to be the subject is moved in a certain direction on the moving image, the movement direction is one factor for determining the visual field transition path.

In the information processing device according to the present technology described above, it is considered that the entire image is a moving image, and the visual field transition path determination unit uses movement speed information indicating a movement speed in the entire image of a subject existing in the transition destination output target region or a subject existing in the transition source output target region on progress of the moving image, in order to determine the visual field transition path.

That is, in a case where one or both of images of each of the transition source and the transition destination (the movable body other than the figure to be the subject) are moved on the moving image, the movement speed is one factor for determining the visual field transition path.

In the information processing device according to the present technology described above, it is considered that the entire image is a moving image, and the visual field transition path determination unit uses subject position information indicating a position of a subject existing in the transition destination output target region in a frame after a required transition time has elapsed, in order to determine the visual field transition path.

In the continuous transition from the transition source to the transition destination (the viewpoint movement), the transition time is required. In a case where the subject of the transition destination has a motion, it is assumed that the position of the subject in the entire image after the required transition time, is different from a position in the frame at a transition start time point. Therefore, the visual field transition path is determined in consideration of a subject position of the transition destination when the required transition time has elapsed.

In the information processing device according to the present technology described above, it is considered that the entire image is a moving image, and the specification unit specifies the transition source output target region and the transition destination output target region, on a basis of a selective instruction of a user with respect to a transition setting image representing a plurality of subject regions each of which is a partial region included in the moving image and indicates an existence position of each of a plurality of subjects in the moving image, in a list.

The position of each of the subjects in the entire image at each time point is displayed in the list, with respect to the user who is a viewer of the image, and thus, for example, the subject can be selected on the transition setting image as the list. Accordingly, the movement of the output target region, that is, the viewpoint movement is performed according to the progress of the moving image, and thus, it is possible to present the subject that the user wants to view while performing the viewpoint movement.

In the information processing device according to the present technology described above, it is considered that the specification unit specifies the transition destination output target region or the transition source output target region, on a basis of a user manipulation of designating a display candidate image, that is performed with respect to a display based on display data including an image of a partial region to be the output target region in the entire image and an existence presentation image representing a display candidate image existing in a still image or a moving image as the entire image.

The existence of the subject of the other display candidate is presented as the existence presentation image, on the displayed image. Then, the user performs a manipulation of selecting a certain display candidate image by the manipulation or the like with respect to the existence presentation image, and thus, image display of performing the viewpoint movement to a region where the display candidate image is included, is realized.

In the information processing device according to the present technology described above, it is considered that the existence presentation image is a thumbnail image of the display candidate image, and the display data includes an image of a current output target region and a thumbnail image of the display candidate image.

That is, existence presentation is performed by a method of superimposing the existing display candidate image, for example, on a part of the current output target region, as a thumbnail image having a uniform size.

In the information processing device according to the present technology described above, it is considered that the existence presentation image is provided at a position corresponding to a position relationship of the display candidate image indicated by the existence presentation image with respect to the image of the partial region.

For example, the existence presentation image of the display candidate image existing in an upper portion on a screen with respect to the current output target region, is presented in the upper portion on the current screen. The existence presentation image of the display candidate image existing in a right portion on the screen with respect to the current output target region, is presented in the right portion on the current screen.

In the information processing device according to the present technology described above, it is considered that the display data includes an existence presentation image corresponding to a display candidate image existing in a designated time axis position, that corresponds to the time axis position designated in the image of the partial region to be the output target region.

In a case of moving image contents, an existence state of each of the display candidate images varies even in a time axis direction. Therefore, it is possible to confirm the existence of the display candidate image on the time axis.

In the information processing device according to the present technology described above, it is considered that the display data includes an existence presentation image indicating a position relationship between the display candidate image and the image of the partial region to be the output target region.

For example, an image indicating a relative position of each of the display candidate images with respect to the current output target region is set to the existence presentation image.

An information processing method according to the present technology, includes: a specification step of specifying a transition source output target region and a transition destination output target region, in an output target region which is a partial region of an entire image, which is an image including a continuous visual field of 360 degrees in at least one direction; and a visual field transition path determination step of automatically determining a visual field transition path from the transition source output target region to the transition destination output target region.

Accordingly, the information processing device automatically determines the visual field transition path.

A program according to the present technology is a program that causes an information processing device to execute: the specification step described above; and the visual field transition path determination step described above. Accordingly, the information processing device capable of automatically determining the visual field transition path, is realized.

Advantageous Effects of Invention

According to the present technology, it is possible to provide visually smooth transition to a viewer, on a display imitating a viewpoint movement as transition from a transition source output target region to a transition destination output target region.

Note that, the effects described herein are not necessarily limited, and may be any effect described in the present disclosure.

MODE(S) FOR CARRYING OUT THE INVENTION

Hereinafter, an embodiment will be described in the following order.
<1. Image of Processing Target of Embodiment>
<2. Configuration of Information Processing Device>
<3. Transition Processing of Output Target Region>
<4. Processing Using Transition Setting Image>
<5. Processing Using Existence Presentation Image>
<6. Conclusion and Modification Example>
<1. Image of Processing Target of Embodiment>

First, an image which is a processing target of an information processing device of this embodiment will be described. The image to be the processing target is an image having a continuous visual field of 360 degrees in at least one direction. In other words, the image to be the processing target is an image having a visual field of 360 degrees. One direction is a linear direction. A straight line as a direction on a spherical surface (a straight line in a case of ignoring a curve generated on a spherical surface in three-dimension) is also included.

Figure 1:
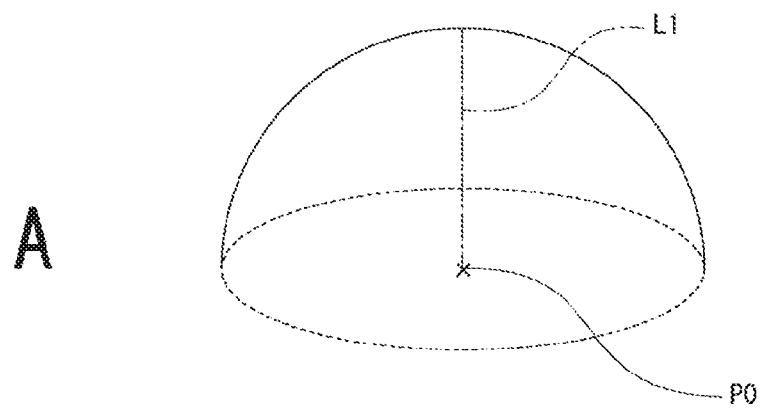
FIG. 1 is an explanatory diagram of a visual field of an image to be displayed in an embodiment of the present technology.
Figure 1:
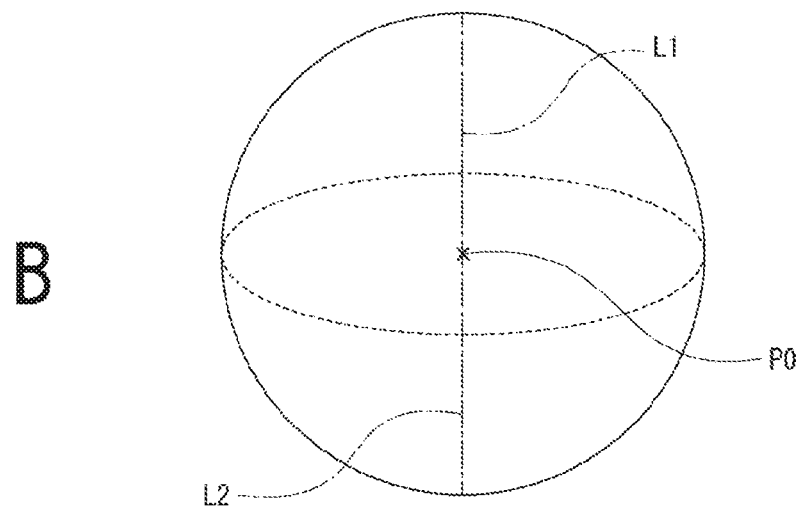
Figure 1:
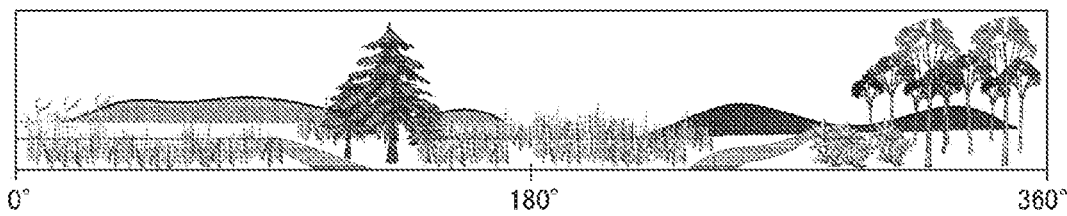

A half celestial sphere image of FIG. 1A, a celestial sphere image of FIG. 1B, a panorama image of 360 degrees of FIG. 1C, and the like are exemplified as a specific example of such an image.

In FIG. 1A, P0 is a reference position of a visual line. P0 can be regarded as a position of an image pickup device at the time of capturing an image, or can be regarded as a position of a viewer at the time of displaying an image.

In the position P0, for example, in a case where capturing is performed by directing a wide-angle lens of the image pickup device, such as a fisheye lens, towards a directly upper side, as illustrated in FIG. 1A, it is possible to obtain a still image or a moving image having an optical axis L1 illustrated by a dot-and-dash line and a half celestial spherical range of which vertical points intersect with each other. That is, the still image or the moving image is a half celestial sphere image having a field angle of 360 degrees in a horizontal direction and 180 degrees in a vertical direction.

In addition, in the position P0 of FIG. 1B, for example, in a case where capturing is performed by disposing the wide-angle lens of the image pickup device towards a directly upper side and a directly lower side, it is possible to obtain an image having a half celestial spherical range on the optical axis L1 side directed towards the directly upper side illustrated by a dot-and-dash line, and similarly, a half celestial spherical range on the optical axis L2 side directed towards the directly lower side illustrated by a dot-and-dash line. Then, in a case where an image captured through a wide-angle lens on an upper surface and an image captured through a wide-angle lens on a lower surface are synthesized, a still image is generated in which one celestial spherical range is captured. In addition, in a case of capturing the moving image, in the image captured through the wide-angle lens on the upper surface and the image captured through the wide-angle lens on the lower surface, simultaneously captured frames are synthesized, and thus, a moving image is generated in which a celestial spherical range is captured.

Such a still image or a moving image is a celestial sphere image having a field angle of 360 degrees in the horizontal direction and 360 degrees in the vertical direction.

FIG. 1C is a so-called panorama image of 360 degrees. The image pickup device captures a range of 360 degrees around the image pickup device, and thus, it is possible to obtain a still image or a moving image as the panorama image of 360 degrees. That is, the still image or the moving image is an image having a field angle of 360 degrees in the horizontal direction.

Note that, here, an example of the field angle in the horizontal direction is exemplified, but a panorama image of 360 degrees having a field angle of 360 degrees in the vertical direction is also assumed.

In this embodiment, control for display output or the like is performed by using such a continuous image having a visual field of 360 degrees in at least one direction as a processing target.

Hereinafter, the embodiment will be described by using the celestial sphere image of FIG. 1B as an example, but the processing to be described can be performed by applying the half celestial sphere image or the panorama image of 360 degrees as the processing target.

When the celestial sphere image is displayed on a display device, the information processing device of the embodiment is capable of cutting out an output target region which is a partial region of the entire image of the celestial sphere image (that is, the entire celestial sphere image having a field angle of 360 degrees in both directions including the horizontal direction and the vertical direction) to be displayed.

Figure 2:
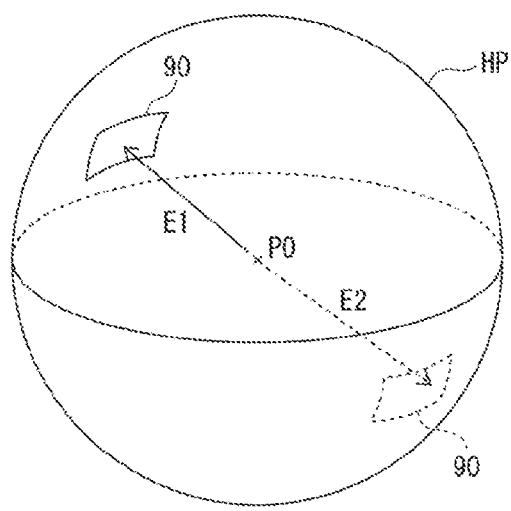
FIG. 2 is an explanatory diagram of transition of an output target region of the embodiment.
Figure 2:
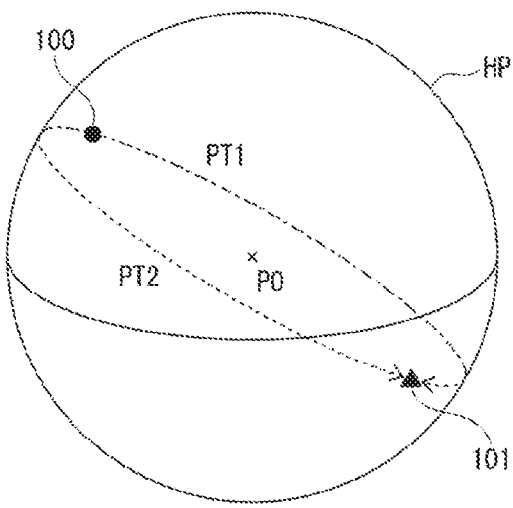

FIG. 2A illustrates an aspect of cutting out a region for display in the celestial sphere image. The entire image HP as the celestial sphere image can be considered as an image of the entire inside circumferential surface of a sphere. That is, the entire image HP is the entire image capable of being seen from the position P0.

A region of a part of the entire image HP is cut out, and is set to an output target region 90. The output target region 90 illustrated by a solid line is an image viewed by the viewer in the position P0 in a visual line direction E1. For example, the image is displayed on the display device by using a part of a region in a certain visual line direction as the output target region 90.

Note that, here, an example of cutting out the region for display cut out has been described, but the region is not limited for display, and it is assumed that a part of a region is cut out, and is edited or recorded in order to prepare edited contents. In such a case, the processing of this embodiment described below, in particular, processing relevant to determination of a transition path can be applied.

The output target region 90 can be arbitrarily changed. For example, the output target region 90 can be an image of a region visible in a visual line direction E2, as illustrated by a broken line.

Thus, the output target region 90 can be selected as an arbitrary region, in the entire image HP. Accordingly, in a case of a still image, the output target region 90 can be changed according to a user manipulation, or the output target region 90 can be automatically changed by the information processing device.

In addition, in a case of a moving image, the output target region 90 can be selected according to the user manipulation or the automatic control, or the output target region 90 can be changed according to the progress of the moving image.

Even though it is not illustrated, the size, an aspect ratio, or the like of the output target region 90 can be set or changed according to the user manipulation or the automatic control.

In addition, it is assumed that the output target region 90, for example, is set to a region including a figure, an animal, a designated target, or the like in the entire image HP as a subject.

For example, when a figure A and a figure B are included as the subject in the entire image HP, processing is performed in which initially, a region including the figure A is cut out as the output target region 90, and is displayed on the display device, and after that, the output target region 90 is changed to a region including the figure B, and the region including the figure B is cut out and is displayed on the display device.

When such an output target region 90 is transitioned, the information processing device of the embodiment performs visual field transition path determination processing.

FIG. 2B illustrates subjects 100 and 101. In a case where the output target region 90 is transitioned from a region including the subject 100 to a region including the subject 101, there are many cases where it is unnatural to suddenly switch a display screen. Therefore, a region to be displayed is gradually changed from the region including the subject 100 to the region including the subject 101.

In a case of a celestial sphere image, paths PT1 and PT2 are assumed in a case where a straight line (in this case, as described above, a curve as a spherical surface is ignored) is considered as a visual field transition path at the time of such transition.

The information processing device of this embodiment performs visual field transition path determination in a plurality of paths (candidate paths) such that transition comfortable for the viewer can be realized. For example, one of the paths PT1 and PT2 is selected as the visual field transition path.

<2. Configuration of Information Processing Device>

The information processing device of this embodiment is embedded in a device such as an image pickup device, an image display device, an image editing device, and a display control device, or is realized by a computer device or the like.

Figure 3:
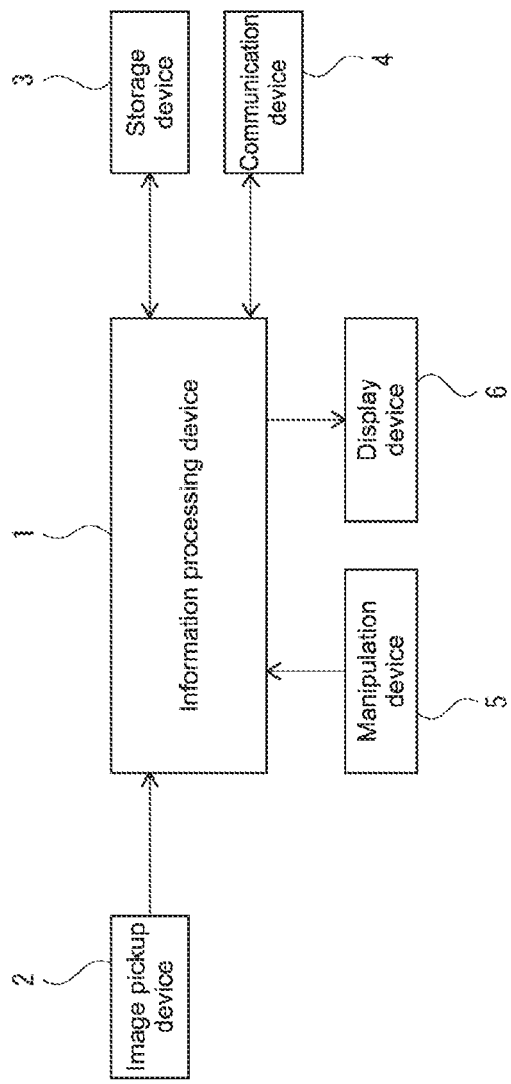
FIG. 3 is a block diagram of an information processing device and peripheral devices of the embodiment.

FIG. 3 illustrates an information processing device 1 of the embodiment, and an image pickup device 2, a storage device 3, a communication device 4, a manipulation device 5, and a display device 6, as a peripheral configuration.

There is a case where the information processing device 1 is configured as an integrated device along with all or a part of the image pickup device 2, the storage device 3, the communication device 4, the manipulation device 5, and the display device 6, illustrated as a device of each of the peripheral units. For example, there is a case where the information processing device 1 is integrated as a camera, a monitor display device, a television device, an image editing device, a computer device, a terminal device, or the like.

In addition, there is a case where the information processing device 1 is a device separated from the illustrated peripheral devices, and performs communication with respect to each of the peripheral devices through a wired or wireless communication path.

The image pickup device 2 illustrated in FIG. 3 performs image capturing as a still image or a moving image, and outputs image data obtained by capturing.

For example, the image pickup device 2 condenses light from the subject on a capturing element such as a complementary metal oxide semiconductor (CMOS) type capturing element or a charge coupled device (CCD) type capturing element, by an optical system provided with a lens such as a cover lens, a zoom lens, and a focus lens, or a diaphragm mechanism.

It is assumed that the image pickup device 2 includes a wide-angle lens in the optical system, in order to capture an image having a continuous visual field of 360 degrees. For example, it is assumed that the image pickup device 2 includes a fisheye lens, and a 360 degrees lens. In addition, the image pickup device 2 may include an omnidirectional capturing optical system or an entire circumferential capturing optical system, or may be configured by being attached with an adaptor including a detachable omnidirectional capturing optical system or an entire circumferential capturing optical system. It is considered that an ambient reflection mirror or a panoramic annular lens (PAL) is used as the omnidirectional capturing optical system or the entire circumferential capturing optical system.

Then, in the image pickup device 2, an electric signal obtained by photoelectric conversion of the capturing element, for example, is subjected to correlated double sampling (CDS) processing, automatic gain control (AGC) processing, or the like, and is further subjected to analog/digital (A/D) conversion processing, with respect to subject light condensed on the capturing element by such an optical system light. Then, a capturing signal as digital data, is subjected to clamp processing of clamping a black level of R, G, and B to a predetermined level, correction processing between color channels of R, G, and B, and processing of generating (separating) a brightness (Y) signal and a color (C) signal from image data of R, G, and B. In addition, the image data subjected to such various signal processings is subjected to definition conversion processing, or for example, encoding processing for recording or communication.

Then, the image pickup device 2 outputs the image data generated by the encoding processing or image data before encoding (so-called, RAW image data) to the information processing device 1.

The storage device 3 stores the image data in a storage medium, or supplies the image data read out from the storage medium to the information processing device 1, according to a request from the information processing device 1.

The storage device 3 stores an image file such as still image data or moving image data, attribute information of the image file, a thumbnail image, and the like, for example, by using a non-volatile memory as the storage medium.

The image file, for example, is stored in the format of a joint photographic experts group (JPEG), a tagged image file format (TIFF), a graphics interchange format (GIF), moving picture experts group (MPEG)-2, MPEG-4, an audio video interleave (AVI), advanced video codec high definition (AVCHD: Registered Trademark), and the like.

In addition, there is a case where the storage device 3 records the RAW image data as the still image data or the moving image data.

The actual configuration of the storage device 3 is variously considered. For example, the storage device 3 may be a storage device using a flash memory as the storage medium, or may be configured of a memory card detachable with respect to a device including the information processing device 1 (for example, a transportable flash memory) and a card recording/reproducing unit performing recording/reproducing access with respect to the memory card. In addition, the storage device 3 is realized as a hard disk drive (HDD) or the like. It is obvious that the storage device 3 may be a recording/reproducing unit corresponding to various storage mediums, such as an optical disk, a magnetooptical disk, a hologram memory medium, a magnetic tape, an optical tape, and a volume recording medium.

The communication device 4 performs wired or wireless communication with respect to the external device (not illustrated), according to the request from the information processing device 1. For example, the communication device 4 transmits or receives the image data or control data. Accordingly, the information processing device 1 is capable of transmitting the image data or the control data to the external device (not illustrated), or of performing processing of acquiring the image data which is supplied from the external device.

It is considered that the communication device 4, for example, performs communication according to a communication method of wireless communication standard or the like, such as wireless fidelity (WIFI) or Bluetooth.

In addition, the communication device 4 may perform communication as a network communication unit, for example, through various networks such as the Internet, a home network, and a local area network (LAN), and may transmit and receive various data items with respect to a server, a terminal, or the like on the network.

The manipulation device 5 has an input function of inputting the user manipulation, and transmit a signal according to the input manipulation to the information processing device 1.

The manipulation device 5, for example, is realized as various manipulators provided on a housing of a device, a touch pad, a touch panel formed in the display unit 34, and the like.

In addition, various manipulations can be performed according to a touch panel manipulation using an icon, a menu, or the like displayed on the touch panel and display device 6.

Alternatively, a tap manipulation of the user may be detected by the touch pad.

In addition, a so-called gesture manipulation of the user may be recognized according to peripheral image recognition, or a sound manipulation may be recognized by having a sound input function.

The display device 6 performs various displays with respect to the user. The display device 6, for example, includes display unit such as a liquid crystal display (LCD) or an organic electro-luminescence (EL) display, and a display driving device thereof.

In addition, the display device 6 receives the image data supplied from the output target region 90, for example, cut out from the celestial sphere image by the information processing device 1, and displays a moving image or a still image. In addition, the display device 6 execute display as various manipulation menus, icons, and messages, that is, a graphical user interface (GUI), on a screen, on the basis of an instruction of the information processing device 1.

The information processing device 1 includes a central processing unit (CPU), a read only memory (ROM), a random access memory (RAM), and the like.

In a case where the information processing device 1 is a device integrated with all or a part of each of the peripheral units such as the image pickup device 2, the storage device 3, the communication device 4, the manipulation device 5, and the display device 6, the information processing device 1 functions as a control unit, and performs operation control with respect to each of the peripheral units according to an operation state, the user manipulation, or the like, on the basis of a program.

In a case where the information processing device 1 is a device separated from each of the peripheral units, the information processing device 1 performs communication of the image data or the control data with respect to the device of each of the peripheral units.

In this embodiment, the information processing device 1 performs at least processing of determining the visual field transition path of the output target region 90 with respect to an image having a visual field of 360 degrees, such as a celestial sphere image.

The information processing device 1 performs the visual field transition path determination processing of the output target region 90 by using the image data captured by the image pickup device 2, the image data read out from the storage medium by the storage device 3, or the image data received through the communication device 4 by being transmitted from the external device, as a target.

In addition, the information processing device 1 is capable of performing display control of performing the transition of the output target region 90, with respect to the image displayed on the display device 6, along the visual field transition path determined in the visual field transition path determination processing.

In addition, the information processing device 1 is capable of allowing information of the visual field transition path determined in the visual field transition path determination processing to correspond to the image data, and of allowing the storage device 3 to store the information in the storage medium.

In addition, the information processing device 1 is capable of adding the information of the visual field transition path determined in the visual field transition path determination processing to the image data (for example, adding the information as meta data), and of transmitting the information to the external device through the communication device 4.

Figure 4:
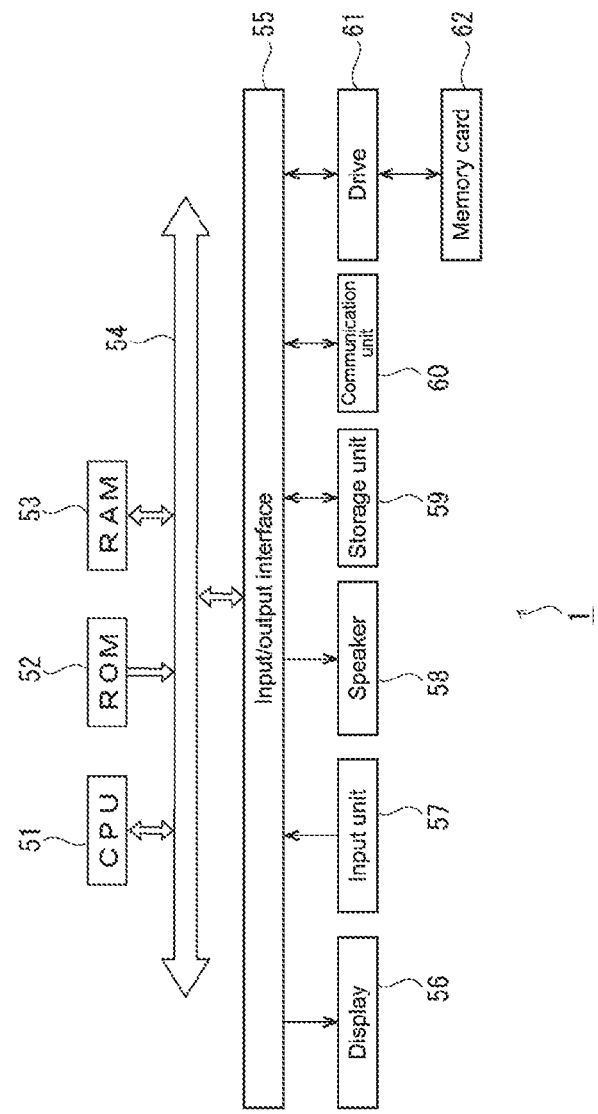
FIG. 4 is a block diagram of a hardware configuration of the information processing device of the embodiment.

A hardware configuration example of the information processing device 1 is illustrated in FIG. 4. Here, an example as a computer device is illustrated.

A CPU 51 of the information processing device 1 executes various processings according to a program stored in a ROM 52 or a program loaded on a RAM 53 from a storage unit 59. In addition, data or the like necessary for the CPU 51 to execute various processings is also suitably stored in the RAM 53.

The CPU 51, the ROM 52, and the RAM 53 are connected to each other through a bus 54. In addition, an input/output interface 55 is also connected to the bus 54.

A display 56 formed of a liquid crystal panel, an organic EL panel, or the like, an input unit 57 formed of a keyboard, a mouse, or the like, a speaker 58, a storage unit 59 configured of an HDD or the like, a communication unit 60 are connected to the input/output interface 55.

In a case where the display device 6 of FIG. 3 is a device integrated with the information processing device 1, the display 56 indicates the display device 6. In a case where the display device 6 is a device separated from the information processing device 1, the display 56 is a display as a computer device, and performs various information displays for a user interface with respect to an operator.

In a case where the manipulation device 5 of FIG. 3 is a device integrated with the information processing device 1, the input unit 57 indicates the manipulation device 5. In a case where the manipulation device 5 is a device separated from the information processing device 1, the input unit 57 indicates an input device used by the operator in the computer device.

The communication unit 60 performs communication processing through a network including the Internet, or communication with respect to the device of each of the peripheral units of FIG. 3.

In addition, as necessary, a drive 61 is connected to the input/output interface 55, a memory card 62 is mounted on the input/output interface 55, and a computer program read out from the memory card 62, as necessary, is installed in the storage unit 59, or data processed in the CPU 51 is stored in the input/output interface 55. It is obvious that the drive 61 may be a recording/reproducing drive with respect to a removable storage medium such as a magnetic disk, an optical disk, and a magnetooptical disk.

In a case of such a computer device, processing as the information processing device of the embodiment, that is, the visual field transition path determination processing or the like is realized by software activated by the CPU 51. A program configuring the software is downloaded from the network, and is read out from the removable storage medium, and thus, is installed in the computer device of FIG. 4. Alternatively, the program may be stored in advance in an HDD or the like as the storage unit 59.

Then, the program is activated in the CPU 51, and thus, it is possible to perform various processings described below.

Note that, the information processing device 1 of the embodiment is not limited to a configuration including a single computer device as illustrated in FIG. 4, but may be configured by systemizing a plurality of computer devices. The plurality of computer devices may be systemized by a LAN or the like, or may be disposed in a remote location by a VPN or the like using the Internet. A plurality of information processing devices may include an information processing device such as a computer device usable by a cloud computing service.

Figure 5:
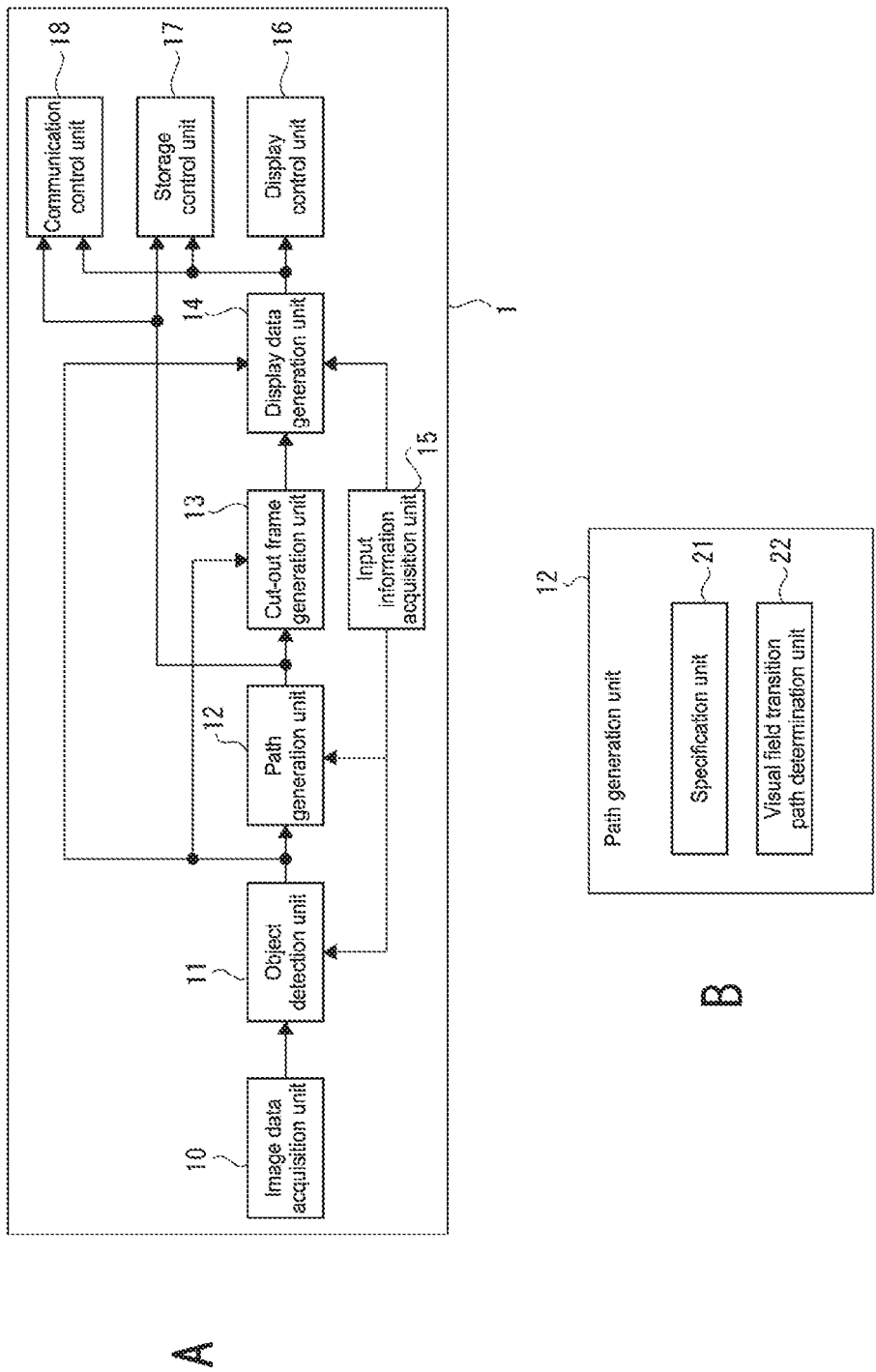
FIG. 5 is a block diagram of a functional configuration of the information processing device of the embodiment.

FIG. 5A and FIG. 5B illustrate a functional configuration example of the information processing device 1 of the embodiment, which is formed of one or a plurality of computer devices or the like.

Note that, each function illustrated in FIG. 5A and FIG. 5B is a function which is realized by processing executed by the CPU 51 according to a program, in the information processing device 1. Here, processing of all or a part of each configuration described below may be realized by hardware.

In addition, in a case where each of the functions is realized by software, it is not necessary that each of the functions is realized by an independent program. Processing of a plurality of functions may be executed by one program, or one function may be realized by cooperation of a plurality of program modules.

In addition, the respective functions may be dispersed in the plurality of computer devices. Further, one of the functions may be realized by the plurality of computer devices. Each of the functions may be realized by the plurality of computer devices configured of a separate housing.

As illustrated in FIG. 5A, the information processing device 1 includes an image data acquisition unit 10, an object detection unit 11, a path generation unit 12, a cut-out frame generation unit 13, a display data generation unit 14, an input information acquisition unit 15, a display control unit 16, a storage control unit 17, and a communication control unit 18.

The image data acquisition unit 10 acquires the image data (the moving image data or the still image data) as the image having a continuous visual field of 360 degrees in at least one direction. That is, for example, the image data such as the celestial sphere image supplied from the image pickup device 2, the storage device 3, or the communication device 4, is acquired.

For example, it is assumed that the image data acquisition unit 10 is a receiving device, an interface device, and an input buffering device, receiving the image data transmitted from the image pickup device 2, a receiving device, an interface device, and an input buffering device, receiving the image data reproduced in the storage device 3, or an interface device or an input buffering device, inputting the image data received by the communication device 4.

The object detection unit 11 performs image analysis with respect to the image data acquired by the image data acquisition unit 10, and detects a specific object to be the subject. For example, a person, an animal, other movable bodies, person's face detection, a specific construction product or object, and the like are detected in the image data.

Such object detection is performed in order to set a cut-out region to be the output target region 90. This is because, for example, a region in which the person's face is projected, is the output target region 90.

The image data and the information of the subject detected by the object detection unit 11 are used in the processing of the path generation unit 12, the cut-out frame generation unit 13, and the display data generation unit 14, as the designated information of the cut-out frame (the output target region 90).

Note that, the designated information of the cut-out frame is not limited to be acquired from the object detection unit 11, but may be manually labelled meta information, maker information applied to the image data at the time of capturing, recognition information acquired by using the other image processing such as face detection or person detection.

As illustrated in FIG. 2B, the path generation unit 12 performs the visual field transition path determination processing at the time of the transition of the output target region 90 from a region of a certain subject 100 to a region of the other subject 101.

The path generation unit 12 generates the visual field transition path from the designated information a plurality of cut-out frames (output target regions 90) by using the properties of the celestial sphere image.

At this time, the path generation unit 12 determines the visual field transition path by determining a visual field transition direction on the basis of a position relationship between the output target region 90 of a transition source and the output target region 90 of a transition destination, a movement direction, a movement speed, information of reliability in a designated region, and the like.

For this reason, as illustrated in FIG. 5B, the path generation unit 12 includes a specification unit 21 and a visual field transition path determination unit 22.

The specification unit performs processing of specifying the output target region 90 of the transition source and the output target region 90 of the transition destination, with respect to the output target region 90 which is a partial region of the entire image HP, as the acquired image data.

The visual field transition path determination unit 22 performs processing of determining the visual field transition path from the output target region of the transition source to the output target region of the transition destination. For example, one path is selected from the paths PT1 and PT2 illustrated in FIG. 2B, and the visual field transition path is determined.

The processing of the path generation unit 12 will be described below in detail.

The cut-out frame generation unit 13 generates the information of the region in the entire image HP, which is cut out as the output target region 90.

For example, a region including the specific subject detected by the object detection unit 11 is set to the cut-out frame.

In addition, in a case of the transition from a certain output target region 90 to the other output target region 90, the information of each cut-out frame to be the output target region 90 at each time point of a transition process is generated, according to the visual field transition path determined in the path generation unit 12.

The display data generation unit 14 performs rendering processing for outputting a cut-out image from the entire image HP, on the basis of the information of the cut-out frame generated by the cut-out frame generation unit 13.

In addition, the display data generation unit 14 may perform processing for superimposedly displaying various images (an icon, a thumbnail, and other images for a manipulation), a menu image to be separately display, and display data generation processing of the image for a manipulation, with respect to the cut-out image of the output target region 90.

In addition, the display data generation unit 14 may perform the display data generation processing including a transition setting image, an existence presentation image, or the like, described below.

The input information acquisition unit 15 acquires the user manipulation information from the manipulation device 5 of FIG. 3 or the input unit 57 of FIG. 4. For example, various manipulation information items of the user, the designated information of the subject, and the like are acquired. The acquired information is used in the object detection unit 11, the path generation unit 12, and the display data generation unit.

The display control unit 16 performs control of allowing the display data of the output target region 90 generated by the display data generation unit to be displayed on the display device 6.

The storage control unit 17 performs control of allowing the display data generated by the display data generation unit, the information of the visual field transition path determined by the path generation unit 12, and the like to be stored in the storage device 3.

The communication control unit 18 performs control of allowing the display data generated by the display data generation unit, the information of the visual field transition path determined by the path generation unit 12, and the like to be transmitted from the communication device 4 to the external device.

<3. Transition Processing of Output Target Region>

Transition processing of the output target region 90 according to the information processing device 1 described above, will be described.

Here, processing in a case where a plurality of different cut-out regions in the entire image HP are moved onto a spherical surface of a celestial sphere, will be described. For example, in FIG. 2A, a case where one path is determined as the visual field transition path in a state where the paths PT1 and PT2 are considered as illustrated in FIG. 2B in order for the transition from the output target region 90 of the visual line direction E1 to the output target region 90 of the visual line direction E2, will be exemplified.

Figure 6:
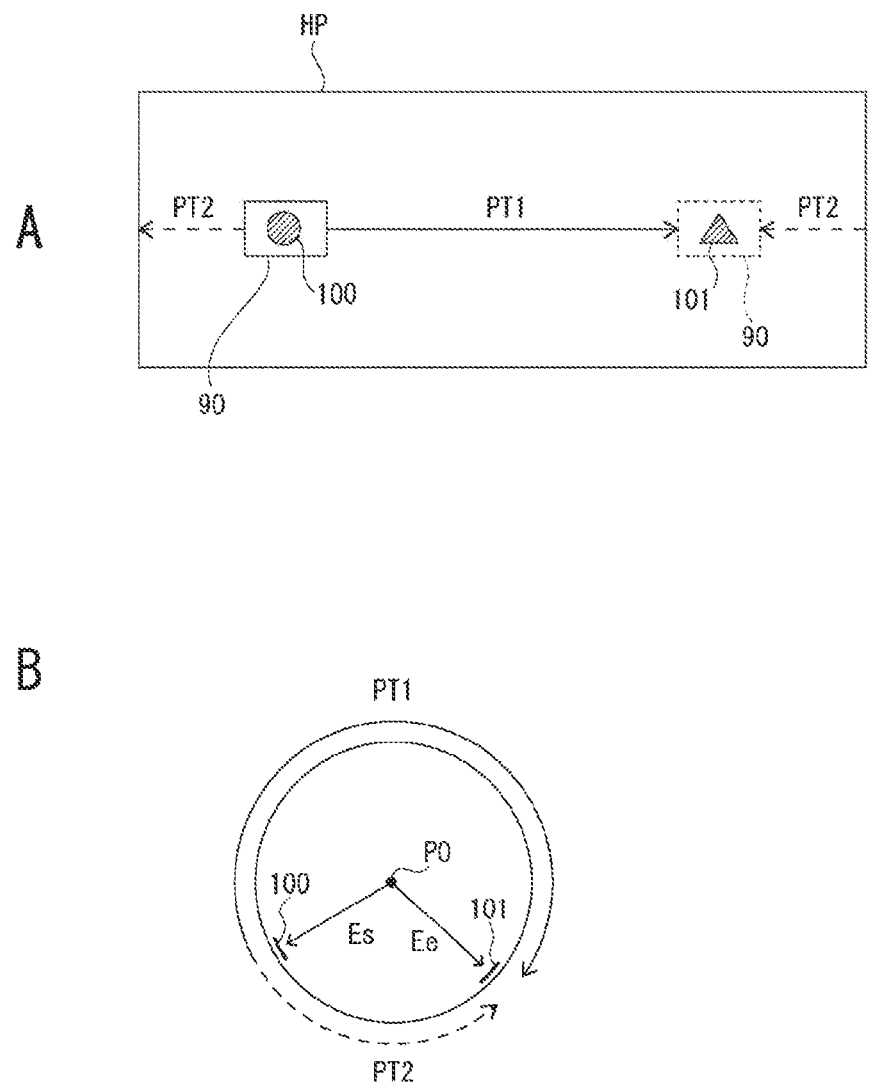
FIG. 6 is an explanatory diagram of visual field transition path determination using movement distance information of the embodiment.

First, an example of using the movement distance information in order to determine the visual field transition path is described in FIG. 6.

FIG. 6A illustrates that the entire image HP of the celestial sphere image is virtually in the shape of a rectangle. Note that, a right end and a left end of FIG. 6A are continuous. The same applies to FIG. 7A to FIG. 7F, FIG. 9A, FIG. 10A, and FIG. 11A described below.

In FIG. 6A, the output target region 90 including the subject 100 is currently displayed. At this time, it is assumed that the output target region 90 is transitioned such that the cut-out frame including the subject 101 becomes the output target region 90.

Here, the transition of the output target region 90 will be described, prior to the determination of the transition path.

Figure 7:
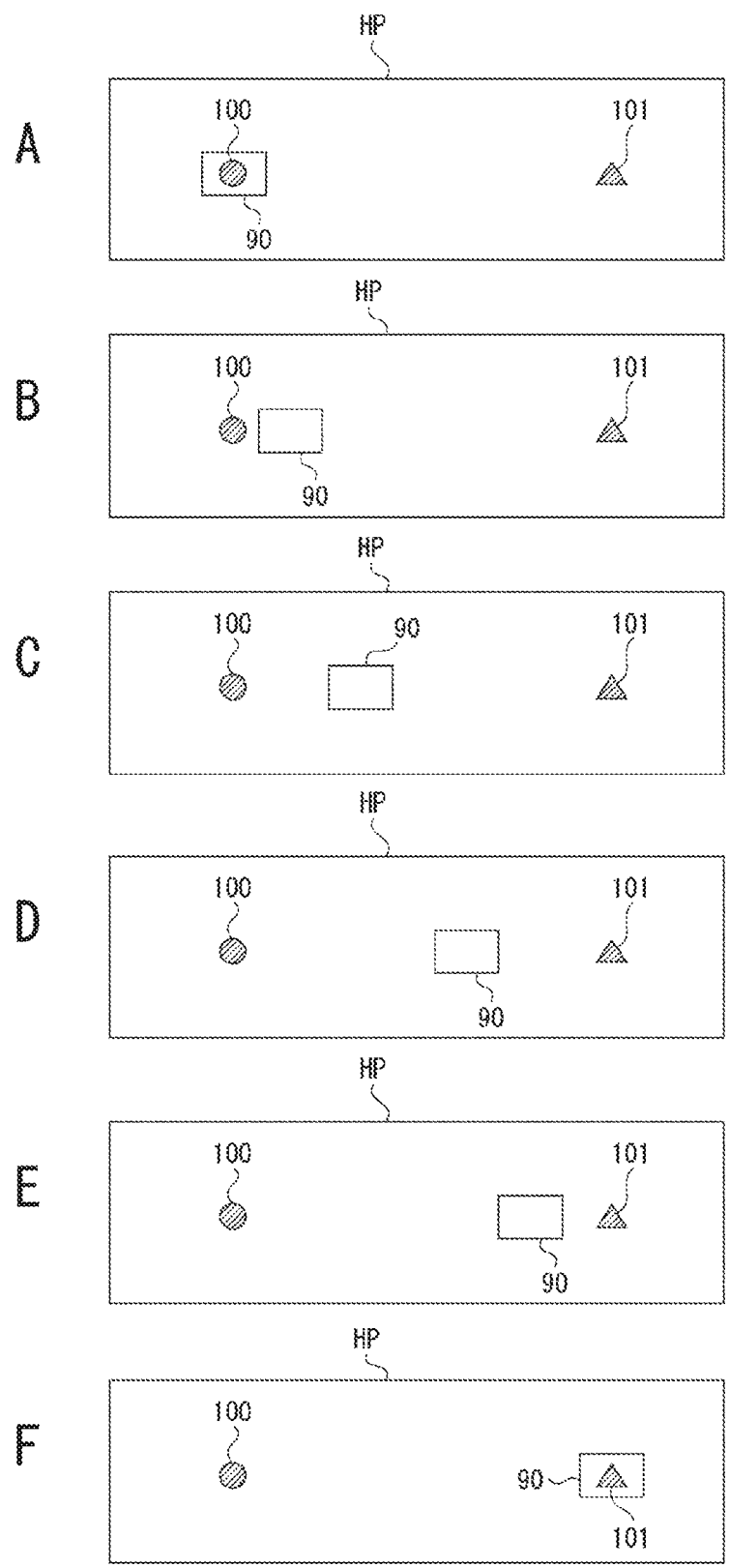
FIG. 7 is an explanatory diagram of the output target region during the transition of the embodiment.

FIG. 7 illustrates an aspect of the transition of the output target region 90. The output target region 90 of FIG. 7A is an image region including the subject 100. In the display device 6, the output target region 90 is displayed, and the user (the viewer) is in a state of viewing the subject 100. From such a state, as illustrated in FIG. 7F, the cut-out region including the subject 101 becomes the output target region 90. That is, the user is in a state where the user is capable of viewing the subject 101 in the display device 6.

For example, instantaneous switching from the state of FIG. 7A to the state of FIG. 7F can also be performed, but in order to apply a display effect of the celestial sphere image to the user, and to apply a more natural viewing environment within the celestial sphere image to the user, the region to be displayed on the display device 6 may be gradually moved within the entire image HP to reach the subject 101. Accordingly, the user is capable of feeling the transition of a scene to be displayed, in such a manner as to look around.

For this reason, the output target region 90 is gradually transitioned from the state of FIG. 7A to FIG. 7B→FIG. 7C→FIG. 7D→FIG. 7E, and finally reaches the state of FIG. 7F. Such a route is referred to as the visual field transition path.

Note that, as illustrated in FIG. 7B to FIG. 7E, an example of how to determine the output target region 90 even though the output target region 90 in the middle is set, in the transition process from the output target region 90 of the transition source to the output target region 90 of the transition destination, will be described.

Figure 8:
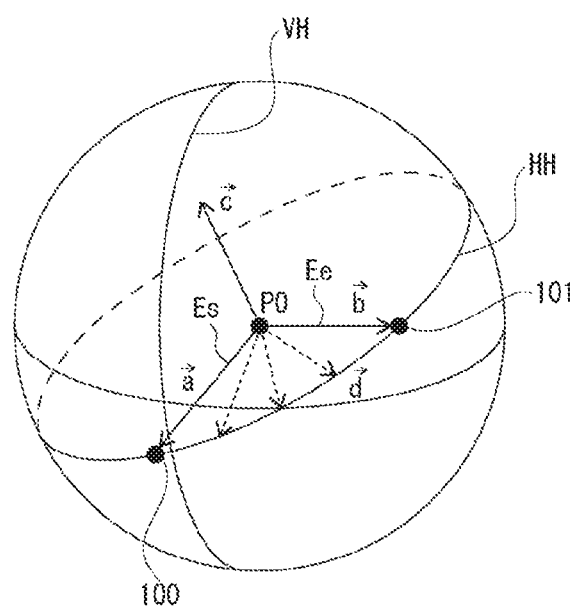
FIG. 8 is an explanatory diagram of a visual line direction of performing interpolation on a spherical surface of the embodiment.

FIG. 8 illustrates an interpolation model between two points on the spherical surface. The position of the subject 100 and the position of the subject 101 are set to two points, and interpolation is performed between two points.

The visual line direction Es is a visual line direction at a transition start time point with respect to the subject 100. The visual line direction Ee is a visual line direction at a transition end time point with respect to the subject 101.

A plane obtained by cutting the sphere such that the position P0 and the position of the subjects 100 and 101 are included in the plane, is set to an interpolation plane HH. The interpolation plane HH is a plane defined by the visual line direction at the transition start point and the transition end point.

An orthogonal plane VH is a plane orthogonal to the interpolation plane HH. A direction vector of the orthogonal plane VH is set to a vector c.

In addition, a vector a of the visual line direction Es at the transition start time point and a vector b of the visual line direction Ee at the transition end time point are set.

The visual line direction to be interpolated, illustrated by a broken line, is set to a vector d.

Note that, in the drawings and the following expressions, a vector symbol "→" is added to the vectors a, b, c, and d.

A control parameter of interpolating the visual line direction at the transition start point and the transition end point is set to "t".

t=0 and 1 is set. t=0 is a value at the transition start point, and t=1 is a value at the transition end point.

First, an outer product of the vectors is used.

$$\vec{c} = \frac{\vec{a} \times \vec{b}}{|\vec{a} \times \vec{b}|}$$ [Expression 1]

Here, each of the vectors a and b is normalized by the vector of the visual line direction Es at the transition start point and the visual line direction Ee at the transition end point.

In addition, an angle θ between the visual line direction Es at the transition start point and the visual line direction Ee at the transition end point is as follow.

$$\theta = \sin^{-1}|\vec{a} \times \vec{b}|$$ [Expression 2]

At this time, the visual line direction to be interpolated (the vector d) can be represented as described below, by using the control parameter t.

$$\vec{d}(t) = \vec{a}\cos(\theta t) + (\vec{c} \times \vec{a})\sin(\theta t)$$ [Expression 3]

Such a vector d is obtained by selecting each value in a range of 0 and 1 with respect to the control parameter t, and thus, the cut-out region to be interpolated can be determined as the output target region 90 of the transition process.

In a case of performing the visual field transition, it is considered that a transition time is set to be constant regardless of a distance to be transitioned, or a transition speed is set to be constant. Further, it is also considered that the movement is performed slowly at the transition start point and the transition end point, but the movement is performed fast in the middle. Such control can be performed by selecting the control parameter t.

In a case where an increase in the value of the control parameter t is set to a constant speed, with respect to the time of the visual field (the visual line direction) transition, the interpolation is performed at regular intervals, that is, the transition at a constant speed is realized. The output target region 90 is moved at a constant speed, and thus, the user is capable of viewing a change in the image with a natural feeling.

In a case where the value of the control parameter t is set by dividing the constant transition time into a predetermined number of times, the transition time becomes constant, that is, the visual field transition is performed such as in a case of transition of a shorter distance, the movement is performed slowly, and in a case of transition of a longer distance, the movement is performed fast.

Further, in a case where the control parameter t gently increases near the visual line direction at the transition start point and the transition end point (that is, near t=0 and near t=1 with respect to the control parameter t), the transition also can be set such that the transition start and end points are gently moved. In a case where the output target region 90 is gently moved near the start end of the transition, it is considered that an image change is more comfortable for the user.

It is obvious that it is also possible to accelerate or decelerate the movement speed by setting an increase in the control parameter t.

On the basis of the above description, returning to FIG. 6, a determination method of the visual field transition path will be described.

In the entire image HP of FIG. 6A, the illustrated paths PT1 and PT2 are assumed as a path from the output target region 90 including the subject 100 to the output target region 90 including the subject 101, in which the output target region 90 is transitioned.

FIG. 6B illustrates an aspect in which the paths PT1 and PT2 are seen from an upper portion of a sphere. That is, FIG. 6B is a state in which the interpolation plane HH is seen from an upper portion on the vector c side of FIG. 8.

In this case, the path is determined such that the distance of the viewpoint movement from the visual line direction Es to the visual line direction Ee becomes shorter on the spherical surface. That is, the movement distance information of the paths PT1 and PT2 is acquired, and a shorter path PT2 is selected as the visual field transition path.

Figure 9:
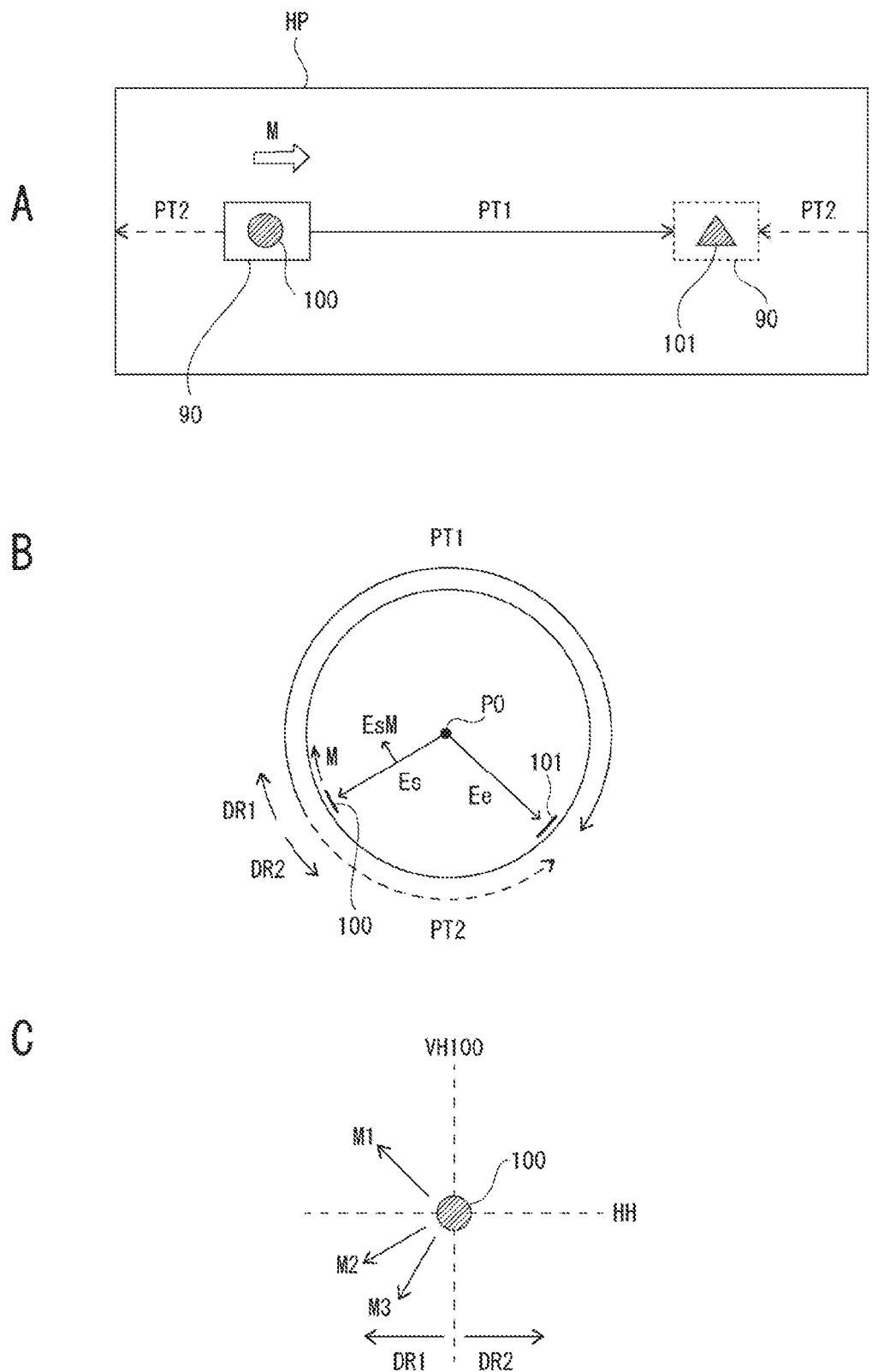
FIG. 9 is an explanatory diagram of visual field transition path determination using movement direction information of a transition source of the embodiment.

Next, an example in which the visual field transition path is determined by using the movement direction information of the subject of the output target region 90 of the transition source, is illustrated in FIG. 9. As with FIG. 6A, in the entire image HP of FIG. 9A, the paths PT1 and PT2 are assumed as the path in which the output target region 90 is transitioned from the output target region 90 including the subject 100 to the output target region 90 including the subject 101. FIG. 9B is a state in which the interpolation plane HH is seen from an upper portion.

Here, the entire image HP is a moving image, and the subject 100 is a movable body other than the figure, for example, and is moved in an arrow M direction. That is, the position of the subject 100 is changed in the arrow M direction, according to the progress of the frame of the moving image.

Note that, in a case of a moving image, the output target region 90 at each time of the transition process, which is selected by the interpolation described in FIG. 7 and FIG. 8, is a region cut out from a frame corresponding to each time. That is, the user (the viewer) is capable of viewing the display with a feeling that the visual line direction is gradually moved on a moving image scene.

In this case, the visual field transition path is determined such that the direction thereof is identical to the direction of the motion in the output target region 90 of the transition source, for example, the direction of the motion of the main subject 100 of the output target region 90.

That is, in this example, the path PT1 is the transition in the DR1 direction, the path PT2 is the transition in the DR2 direction, and the subject 100 is moved in the DR1 direction, and thus, the path PT1 is selected as the visual field transition path. Accordingly, the user moves the visual line direction to an arrow EsM, and initially, the transition is performed such that the scene is changed while following the subject 100 with eyes.

Note that, the information processing device 1 may analyze the direction of the motion of the subject existing in the output target region 90, for example, according to subject recognition and position comparison of a plurality of frames, or may grasp the direction with reference to the meta data added to the image data. In addition, a global vector with respect to the cut-out region may be analyzed, and may be a motion direction of the main subject.

In addition, it is not necessary that the motion direction of the subject 100 is limited to a horizontal direction with respect to the interpolation plane HH. For example, as illustrated in FIG. 9C, each case of directions M1, M2, and M3 which are not horizontal to the interpolation plane HH, is assumed. Note that, as illustrated in FIG. 8, the interpolation plane HH is a plane defined by the visual line direction at the transition start point and the transition end point, and FIG. 9C is a diagram of a case in which it is considered that coordinates are rotated such that the transition source and the transition destination are horizontal to each other.

The information processing device 1, for example, may determine whether the motion of the subject 100 is in the DR1 direction or the DR2 direction, with reference to an orthogonal plane VH100 including the position of the subject 100 at the transition start time point. That is, it may be discriminated whether to include a vector component of the DR1 direction or to include a vector component of the DR2 direction. Accordingly, in any case of the illustrated directions M1, M2, and M3, the motion direction of the subject 100 is set to the DR1 direction.

In other words, it may be discriminated to which direction of the candidate path (DR1 and DR2) a vector component is common, with respect to the directions M1, M2, and M3, and the like.

Figure 10:
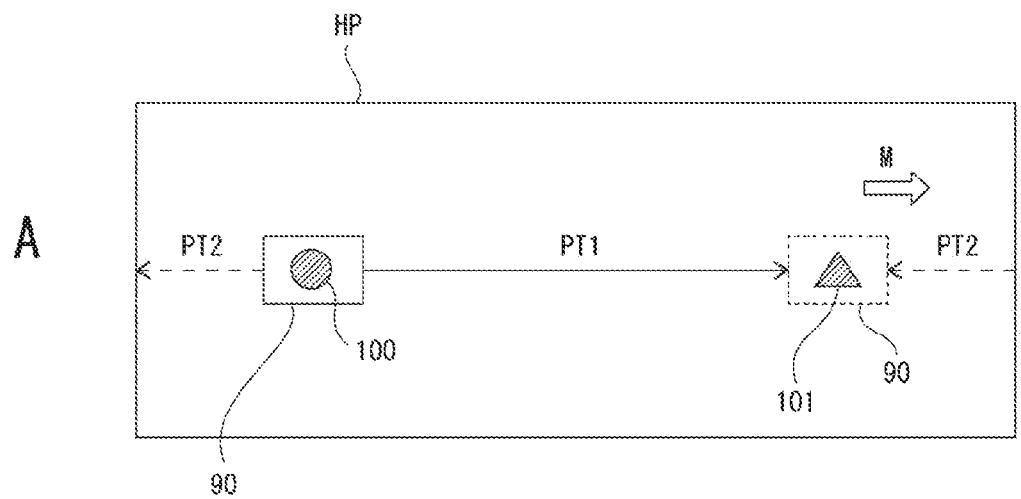
FIG. 10 is an explanatory diagram of visual field transition path determination using movement direction information of a transition destination of the embodiment.
Figure 10:
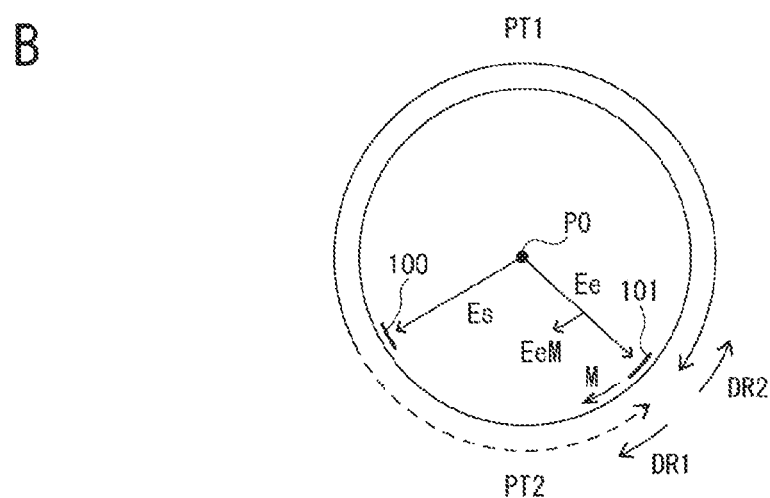
Figure 10:
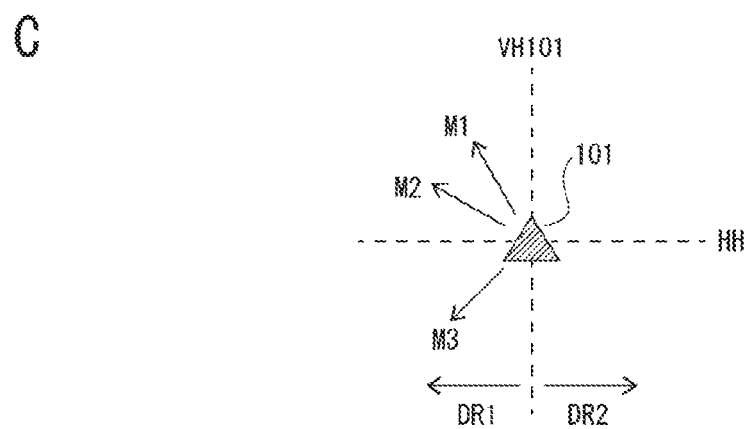

Next, an example in which the visual field transition path is determined by using the movement direction information of the subject of the output target region 90 of the transition destination, is described in FIG. 10. As with FIG. 6A, in the entire image HP of FIG. 10A, the paths PT1 and PT2 are assumed as the path in which the output target region 90 is transitioned from the output target region 90 including the subject 100 to the output target region 90 including the subject 101. FIG. 10B is a state in which the interpolation plane HH is seen from an upper portion.

In this example, the entire image HP is a moving image, and the subject 101 is a movable body other than the figure, and for example, is moved in the arrow M direction. That is, the position of the subject 101 is changed in the arrow M direction, according to the progress of the frame of the moving image.

The visual field transition path is determined such that the direction thereof is identical to the direction of the motion in the output target region 90 of the transition destination, for example, the direction of the motion of the main subject 101 in the output target region 90 of the transition destination.

In this example, the path PT1 is the transition of the DR1 direction, the path PT2 is the transition of the DR2 direction, and the subject 101 is moved in the DR1 direction, and thus, the path PT1 is selected as the visual field transition path. Accordingly, the transition is performed such that the user gradually moves the visual field from the visual line direction Es, and then, finally follows the subject 101 with eyes to reach the output target region 90 of the subject 101.

In this case, in the information processing device 1, it is not necessary that the motion direction of the subject 101 is limited to the horizontal direction with respect to the interpolation plane HH. For example, as illustrated in FIG. 10C, each case of the directions M1, M2, and M3 which are horizontal to the interpolation plane HH is assumed. However, the information processing device 1, for example, may determine whether the motion of the subject 101 is in the DR1 direction or the DR2 direction, according to which vector component of the DR1 direction and the DR2 direction is included, with reference to an orthogonal plane VH101 including the position of the subject 101 at the transition start time point. Accordingly, in any case of the illustrated directions M1, M2, and M3, the motion direction of the subject 101 is set to the DR1 direction.

However, there is a case where both of the subject 100 included in the output target region 90 of the transition source and the subject 101 included in the output target region 90 of the transition source are moved.

In this case, in a case where the motion directions are different from each other, it is considered that the visual field transition path is determined according to the subject having a faster movement speed.

That is, the information processing device 1 acquires movement speed information Vs of the subject 100 of the output target region 90 of the transition source, and acquires movement speed information Ve of the subject 101 of the output target region 90 of the transition destination. Simply, in the continuous frames, for example, a frame at the transition start point and the next frame, a difference in positions within the entire image HP of the subject 100 (the number of pixels or a distance corresponding to a positional difference) may be set to the movement speed information Vs, and similarly, a positional difference of the subject 101 may be set to the movement speed information Ve.

It is obvious that the movement speed information items Vs and Ve may be set by calculating the actual speed value.

Then, the movement speed information items Vs and Ve are compared to each other, and faster one is determined. In a case where the subject 100 is faster than the subject 101, as illustrated in FIG. 9, the visual field transition path is selected in the paths PT1 and PT2, according to the motion direction of the subject 100. In a case where the subject 101 is faster than the subject 100, as illustrated in FIG. 10, the visual field transition path is selected in the paths PT1 and PT2, according to the motion direction of the subject 101.

Note that, in a case where the motion direction of the subject 100 is the same direction, it is obvious that the visual field transition path may be determined according to the motion direction.

Figure 11:
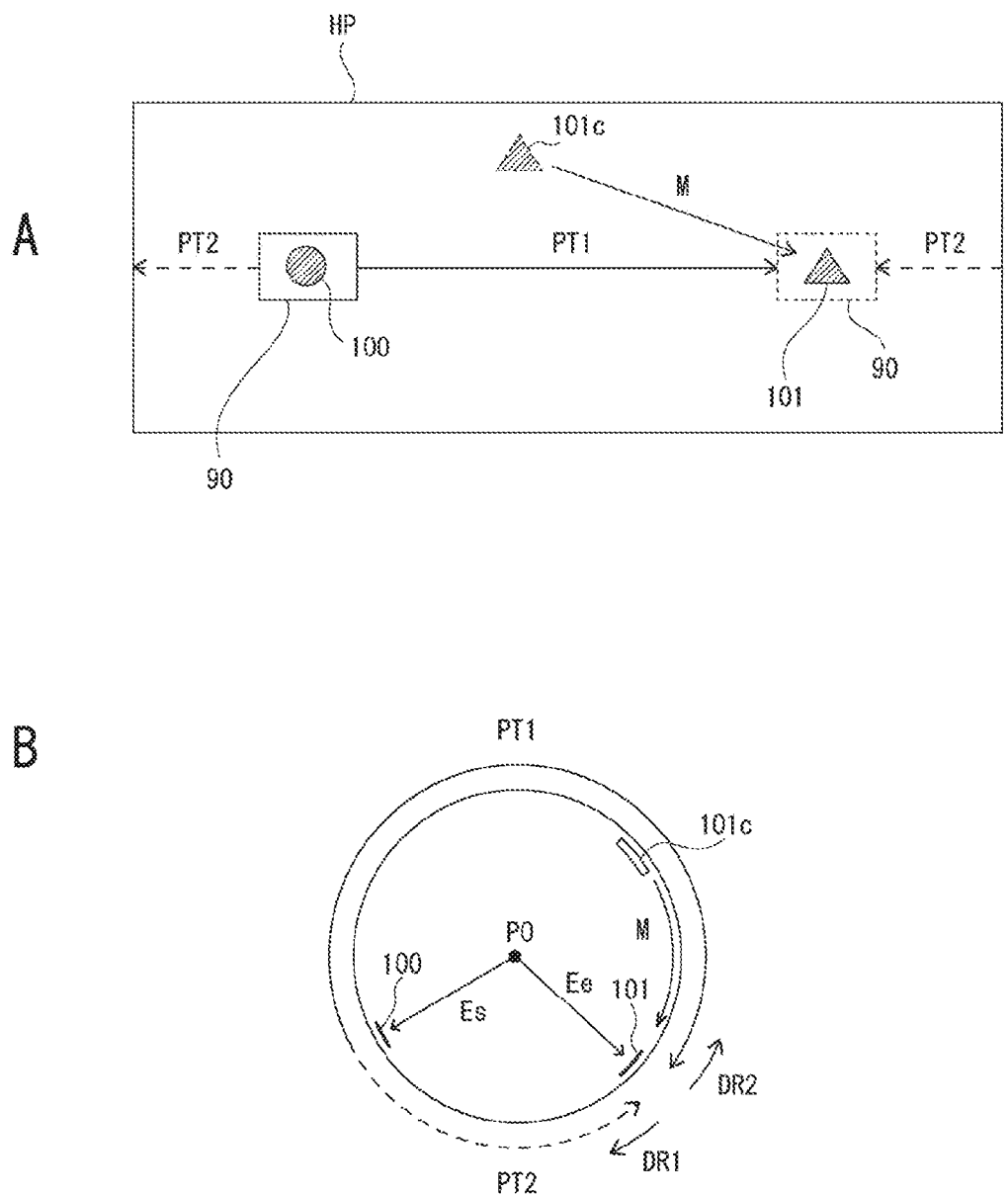
FIG. 11 is an explanatory diagram of visual field transition path determination using subject position information of the transition destination of the embodiment.

Next, an example in which subject position information indicating the position of the subject 101 existing in the output target region 90 of the transition destination in a frame after a required transition time has elapsed, is used in order to determine the visual field transition path, is described in FIG. 11.

As with FIG. 6A, in the entire image HP of FIG. 11A, the transition from the output target region 90 including the subject 100 to the output target region 90 including the subject 101 is considered. FIG. 11B is a state in which the interpolation plane HH is seen from an upper portion.

Here, the subject 101 as the transition destination exists in a position in the entire image HP, which is represented as a subject 101c, at the transition start time point. However, the subject 101 is moved in the M direction in the drawing, and exists in the position of the illustrated subject 101 in consideration of the position at the transition end time point.

In this case, the information processing device 1 confirms the position of the subject 101 at the transition end point, and assumes the paths PT1 and PT2 to be a candidate, with reference to the subject 101. Then, in the paths PT1 and PT2, one having a shorter distance is selected as the visual field transition path.

Note that, in consideration of the premise that the transition time is set to be constant, the position of the subject 101 in a frame after the number of frames corresponding to the transition time may be determined as the position of the subject 101 at the transition end point.

In addition, for example, in a case where the movement speed is set to be constant at the time of the transition, in consideration of the movement speed of the output target region 90 and the movement speed of the subject 101, a time T1 when the output target region 90 reaches the subject 101 in a case of the path PT1, and a time T2 when the output target region 90 reaches the subject 101 in a case of the path PT2, may be calculated, and a path having a shorter time may be selected. The path to be selected as a result is a path having a shorter movement distance, with respect to the position of the subject 101 at the transition end point.

As described above, an example of determining the visual field transition path has been described, but it is obvious that a determination method other than the exemplified determination method is also considered.

In the visual field transition path determination processing, it is also considered that one having higher reliability is selected in the subjects of the transition source and the transition destination, and a viewpoint movement direction (that is, the transition direction) is determined according to the movement direction of the selected subject, on the basis of reliability information of the region which is cut out and designated.

In a case where the region which is cut out and designated, is acquired in the image processing such as "object detection" or "face detection", likelihood of a detection accuracy is used as a specific example of the reliability information. In a case where the region which is cut out and designated, is acquired by the user input such as "labeling" or "maker", a priority is used as a reliability. For example, in the region which is cut out and designated, it is also considered that the priority can be set to be higher in the user input than in the object detection, or the priority can also be input by the user in the labeling, and thus, a subject having a higher reliability is selected according to the priority.

Figure 12:
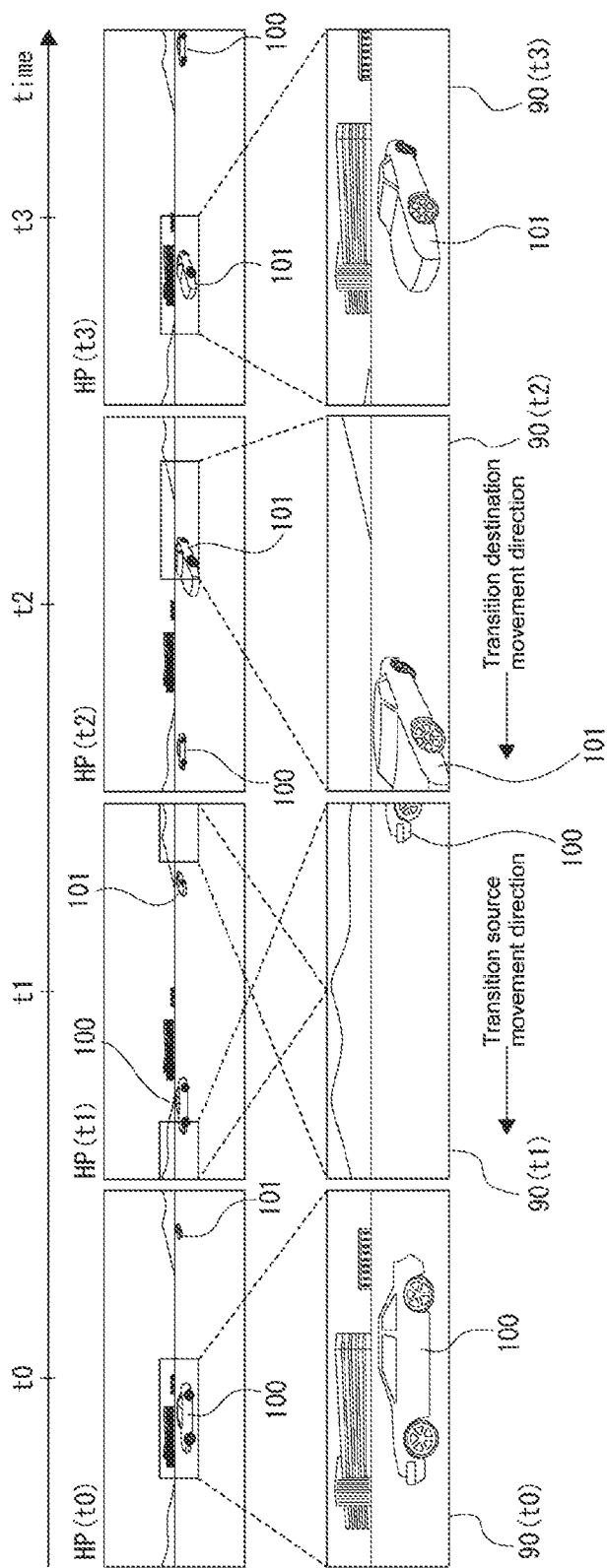
FIG. 12 is an explanatory diagram of an aspect of the transition of the output target region of the embodiment.

FIG. 12 illustrates an example of the transition of the output target region 90 within the entire image HP, as a moving image. In an upper portion of the drawing, frames HP(t0), HP(t1), HP(t2), and HP(t3) are illustrated as the entire image HP. Such frames are frames at time points t0, t1, t2, and t3.

In a lower portion of the drawing, images which are cut out from the frames HP(t0), HP(t1), HP(t2), and HP(t3) at each of the time points to be output target regions 90(t0), 90(t1), 90(t2), and 90(t3), are illustrated. That is, the image is an image that the user actually views.

At the time point t0, the output target region 90(t1) including an automobile as the subject 100 is displayed. The transition is performed from the subject 100 to the other automobile of the subject 101.

Note that, both of the automobiles of the subjects 100 and 101 are moved in a left direction on the paper. For this reason, the visual field transition path is determined such that the visual line direction is moved to a left side, and the transition of the output target region 90 is performed.

For example, at the time point t1, the output target region 90(t1) is moved to the left side within the entire image HP. Since it is a continuous image of 360 degrees, the cut-out region is a region from a left end portion to a right end portion of the frame HP(t1) of the entire image HP. The output target region 90(t1) is in a state of including only a tip end of the automobile of the subject 100 of the transition source.

At the time point t2, the output target region 90(t2) is further moved to the left side within the entire image HP. The output target region 90(t2) is in a state of including a part of the automobile as the subject 101.

At the time point t3, the output target region 90(t3) is further moved to the left side within the entire image HP, and the output target region 90(t3) is in a state of including the entire automobile as the subject 101. That is, the output target region 90(t3) is in a state where the transition is ended.

For example, the visual field transition path is determined in consideration of the motion of the subjects 100 and 101, and thus, it is possible to apply the visual line movement with a natural feeling to the user.

Various processing examples of the information processing device 1 for determining the visual field transition path as described above, will be described as path determination processings I to V. The following processing examples is processing which is executed by the path generation unit 12 of the information processing device 1, according to the function of the specification unit 21 and the visual field transition path determination unit 22 illustrated in FIG. 5B.

Figure 13:
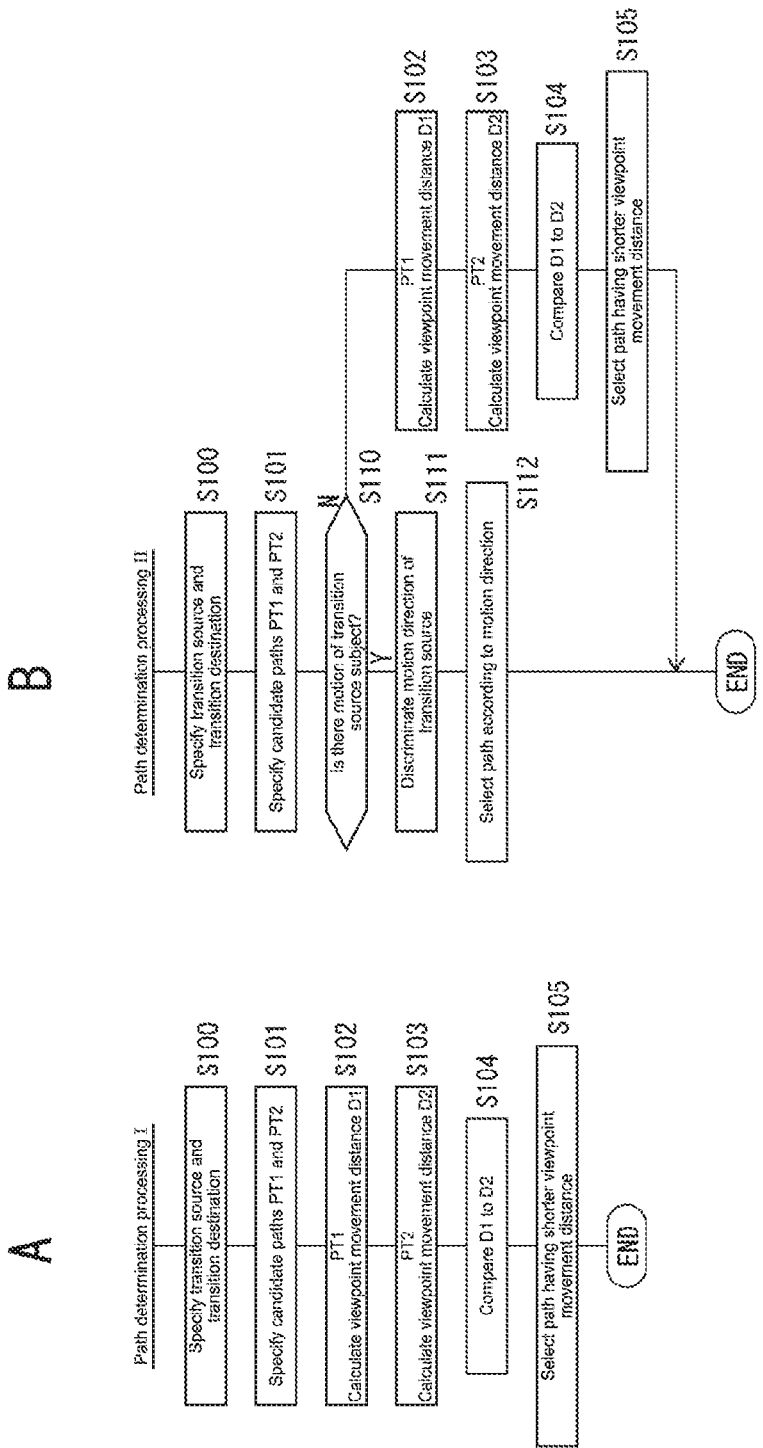
FIG. 13 is a flowchart of path determination processings I and II of the embodiment.

FIG. 13A illustrates the path determination processing I. This is an example of determining the visual field transition path by using the movement distance information described in FIG. 6.

The path generation unit 12 specifies the transition source and the transition destination in Step S100. For example, the output target region 90 of the transition source is set to the currently displayed output target region 90. The output target region 90 of the transition destination is set to a region including a specific subject detected by the object detection unit 11.

Note that, even though it will be described below, there is a case where the output target region 90 of the transition source is specified by a designation manipulation or the like of the user.

In Step S101, the path determination unit 22 specifies the paths PT1 and PT2 to be the candidate described above (hereinafter, the paths PT1 and PT2 will be referred to as a "candidate path"), as the path from the output target region 90 of the determined transition source to the output target region 90 of the transition destination.

In Step S102, the path generation unit 12 calculates a viewpoint movement distance D1 with respect to the candidate path PT1. The viewpoint movement distance D1 is a movement distance in a case of adopting the candidate path PT1.

In Step S103, the path generation unit 12 calculates a viewpoint movement distance D2 with respect to the candidate path PT2. The viewpoint movement distance D2 is a movement distance in a case of adopting the candidate path PT2.

In Step S104, the path generation unit 12 compares the viewpoint movement distances D1 and D2 to each other.

Then, in Step S105, the path generation unit 12 selects a path having a shorter viewpoint movement distance in the candidate paths PT1 and PT2, and the selected path is determined as the visual field transition path.

FIG. 13B illustrates path determination processing II. This is an example of determining the visual field transition path by using the movement direction information of the subject 100 of the transition source described in FIG. 9.

Note that, in the following flowchart, the same step numbers are applied to the processings described above, and the detailed description will be omitted.

In Step S100, the path generation unit 12 specifies the transition source and the transition destination, and in Step S101, the path generation unit 12 specifies the candidate paths PT1 and PT2.

Here, in Step S110, the path generation unit 12 allows the processing to branch according to whether or not there is a motion with respect to the subject 100 of the output target region 90 of the transition source.

In a case where there is no motion with respect to the subject 100, the same processing as that of FIG. 13A is performed, that is, a path having a shorter viewpoint movement distance is selected in the candidate paths PT1 and PT2, and the selected path is determined as the visual field transition path, according to Steps S102, S103, S104, and S105.

On this other hand, in a case where there is a motion with respect to the subject 100 of the output target region 90 of the transition source, the path generation unit 12 proceeds to Steps S110 and Sill, and discriminates the movement direction of the subject 100 of the transition source. That is, the DR1 direction or the DR2 direction in FIG. 9 is discriminated.

Then, in Step S112, the path generation unit 12 selects one of the candidate paths PT1 and PT2 according to the discriminated motion direction, and the selected path is determined as the visual field transition path.

For example, in a case where the candidate path PT1 is a path on which the viewpoint movement of the DR1 direction is performed, the candidate path PT2 is a path on which the viewpoint movement of the DR2 direction is performed, and the movement direction of the subject 100 is the DR1 direction, the candidate path PT1 is selected.

Figure 14:
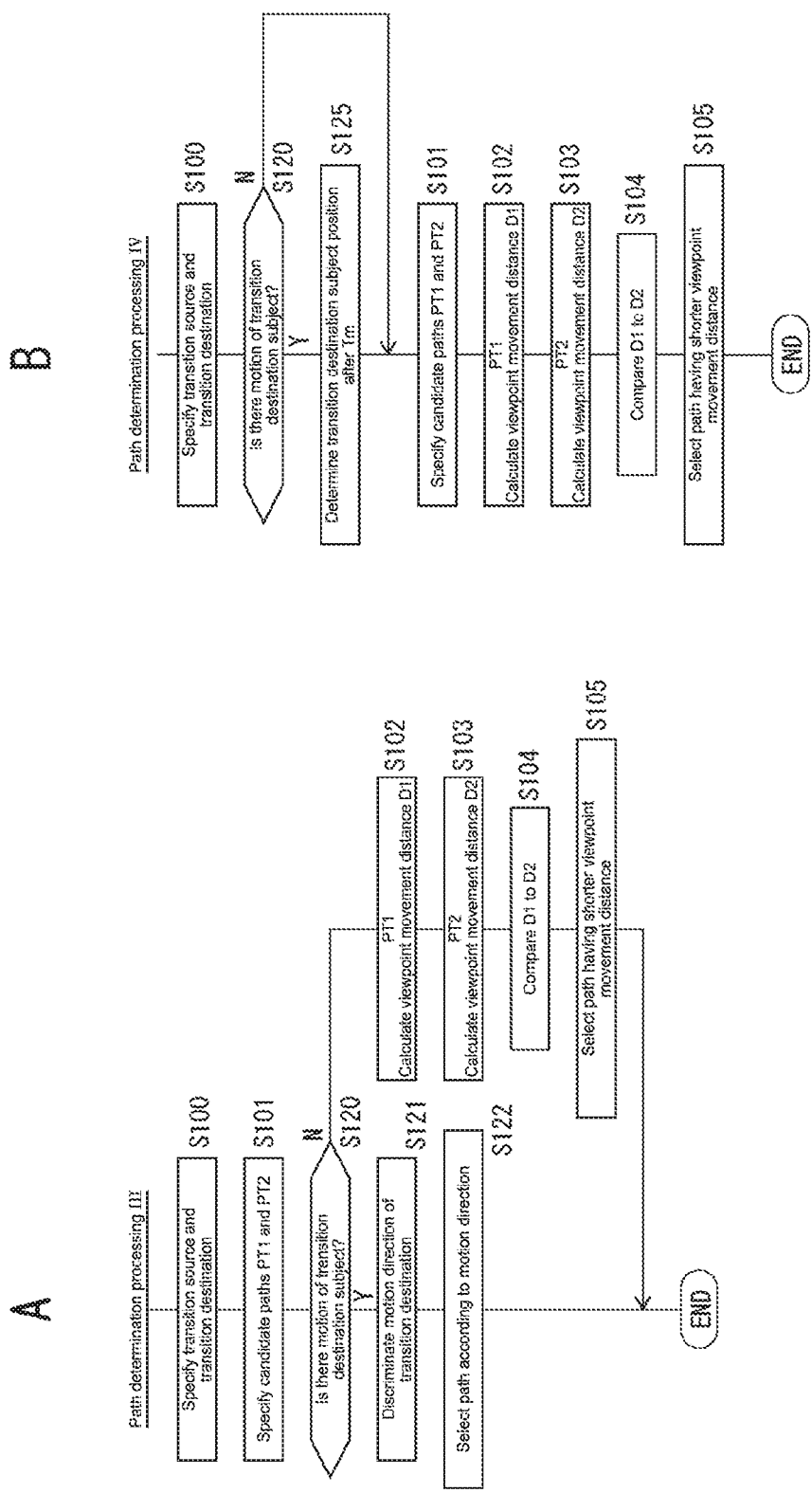
FIG. 14 is a flowchart of path determination processings III and IV of the embodiment.

FIG. 14A illustrates path determination processing III. This is an example of determining the visual field transition path by using the movement direction information of the subject 101 of the transition destination described in FIG. 10.

In Step S100, the path generation unit 12 specifies the transition source and the transition destination, and in Step S101, the path generation unit 12 specifies the candidate paths PT1 and PT2.

Here, in Step S120, the path generation unit 12 allows the processing to branch according to whether or not there is a motion with respect to the subject 101 of the output target region 90 of the transition destination.

In a case where there is no motion with respect to the subject 101, the same processing as that of FIG. 13A is performed, that is, a path having a shorter viewpoint movement distance is selected in the candidate paths PT1 and PT2, and the selected path is determined as the visual field transition path, according to Steps S102, S103, S104, and S105.

On this other hand, in a case where there is a motion with respect to the subject 101 of the output target region 90 of the transition destination, the path generation unit 12 proceeds to Step S121 from Step S120, and the movement direction of the subject 101 of the transition destination is discriminated. That is, the DR1 direction or the DR2 direction in FIG. 10 is discriminated.

Then, in Step S122, the path generation unit 12 selects one of the candidate paths PT1 and PT2 according to the discriminated motion direction, and determines the selected path as the visual field transition path.

For example, in a case where the candidate path PT1 is a path on which the viewpoint movement of the DR1 direction is performed, the candidate path PT2 is a path on which the viewpoint movement of the DR2 direction is performed, and the movement direction of the subject 101 is the DR1 direction, the candidate path PT1 is selected.

FIG. 14B illustrates path determination processing IV. This is an example of determining the visual field transition path by using the subject position information at the transition end time point of the subject 101 of the transition destination described in FIG. 11.

In Step S100, the path generation unit 12 specifies the transition source and the transition destination, and subsequently, in Step S120, the path generation unit 12 determines whether or not there is a motion with respect to the subject 101 of the transition destination.

In a case where there is a motion, in Step S125, a position within the entire image HP of the subject 101 of the transition destination after a time Tm is determined, and then, the path generation unit 12 proceeds to Step S101. The time Tm is time required for the transition. Specifically, the path generation unit 12 determines the position of the subject 101 in the corresponding frame after the time Tm from the current frame.

In a case where there is no motion in the subject 101, the path generation unit 12 proceeds to Step S101 without performing Step S125.

In Step S101, the path generation unit 12 specifies the candidate paths PT1 and PT2. Here, in this case, in a case where there is a motion in the subject 101, the transition destination is changed to the cut-out region including the subject 101 after the time Tm, and then, the candidate paths PT1 and PT2 are set.

Then, the path generation unit 12 performs the same processing as that in FIG. 13A, that is, selects a path having a shorter viewpoint movement distance in the candidate paths PT1 and PT2, and determines the selected path as the visual field transition path, according to Steps S102, S103, S104, and S105.

Accordingly, in a case where there is a motion in the subject 101 of the transition destination, a path having a shorter transition distance is selected, with reference to the position of the subject 101 after the time required for the transition.

Figure 15:
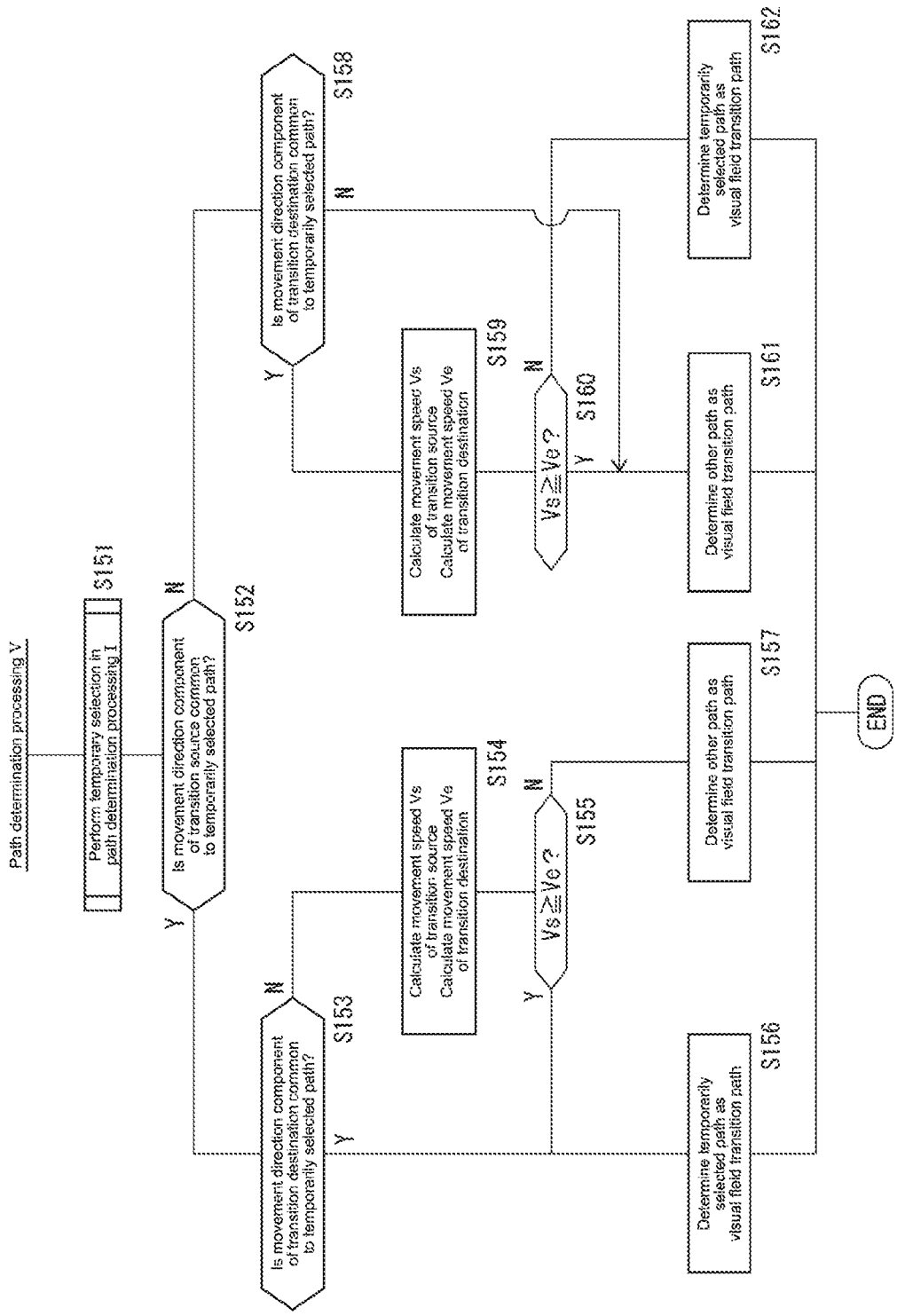
FIG. 15 is a flowchart of path determination processing V of the embodiment.

FIG. 15 illustrates path determination processing V. This is an example of determining the visual field transition path by using the movement speed information, in a case where both of the subject 100 of the transition source and the subject 101 of the transition destination are a moving subject.

The path generation unit 12 temporarily selects the visual field transition path as Step S151. For example, the path generation unit 12 executes the path determination processing I (S100 to S105) described in FIG. 13A, and performs temporary selection of temporarily setting the path selected in the processing, that is, the path having a shorter viewpoint movement distance, to the visual field transition path.

In Step S152, the path generation unit 12 determines whether or not a movement direction component of the subject 100 of the transition source is common to the temporarily selected path. That is, it is discriminated which component of the DR1 direction or the DR2 direction illustrated in FIG. 9 and FIG. 10 the movement direction of the subject 100 includes, and it is confirmed whether or not the movement direction component is common to the movement direction of the temporarily selected path.

In a case where the movement direction component of the subject 100 of the transition source is common to the movement direction of the temporarily selected path, the path generation unit 12 proceeds to Step S153, and in this time, it is confirmed whether or not the movement direction component (DR1 Direction/DR2 Direction) of the subject 101 of the transition destination is common to the temporarily selected path.

In a case where the movement direction component is common to the temporarily selected path, the movement direction components of both of the subject 100 of the transition source and the subject 101 of the transition destination are in common, and are also common to the movement direction of the temporarily selected path. Accordingly, in this case, the path generation unit 12 proceeds to Step S156, and determines the temporarily selected path as the visual field transition path.

In Step S153, in a case where the movement direction component of the subject 101 of the transition destination is not common to the temporarily selected path, the motion directions of the subject 100 and the subject 101 (the direction components of DR1 Direction/DR2 Direction) are not coincident with each other.

In this case, in Step S154, the movement speed information Vs of the subject 100 of the transition source and the movement speed information Ve of the subject 101 of the transition destination are calculated. For example, the actual movement speed is calculated, and then, is set to the movement speed information items Vs and Ve. Then, in Step S155, it is determined whether or not Vs ≥Ve is satisfied.

In a case where Vs ≥Ve is satisfied, that is, the subject 100 of the transition source is faster than the subject 101 of the transition destination, the path is selected according to the movement direction of the subject 100. In this case, the movement direction component of the subject 100 is common to the temporarily selected path, and thus, the path generation unit 12 proceeds to Step S156, and determines the temporarily selected path as the visual field transition path.

On this other hand, in a case where Vs ≥Ve is not satisfied, that is, the subject 101 of the transition destination is faster than the subject 100 of the transition source, the path is selected according to the movement direction of the subject 101. In this case, the movement direction component of the subject 101 is not common to the temporarily selected path. Therefore, the path generation unit 12 proceeds to Step S157, and determines a path which is not selected to the temporarily selected path in Step S151, as the visual field transition path.

In Step S152, in a case where the movement direction component of the subject 100 of the transition source is not common to the movement direction of the temporarily selected path, the path generation unit 12 proceeds to Step S158, and in this case, it is confirmed whether or not the movement direction component of the subject 101 of the transition destination (DR1 Direction/DR2 Direction) is common to the temporarily selected path.

In a case where the movement direction component is common to the temporarily selected path, the movement direction components of both of the subject 100 of the transition source and the subject 101 of the transition destination are not coincident with the movement direction of the temporarily selected path.

Accordingly, in this case, the path generation unit 12 proceeds to Step S161, and a path which is not selected to the temporarily selected path in Step S151 is determined as the visual field transition path.

In Step S158, in a case where the movement direction component of the subject 101 of the transition destination is common to the temporarily selected path, the motion directions of the subject 100 and the subject 101 (the direction components of DR1 Direction/DR2 Direction) are not coincident with each other.

In this case, in Step S159, the movement speed information Vs of the subject 100 of the transition source and the movement speed information Ve of the subject 101 of the transition destination are calculated.

Then, in Step S160, it is determined whether or not Vs≥Ve is satisfied.

In a case where Vs≥Ve is satisfied, that is, the subject 100 of the transition source is faster than the subject 101 of the transition destination, the path is selected according to the movement direction of the subject 100. In this case, the movement direction component of the subject 100 is not common to the temporarily selected path, and thus, the path generation unit 12 proceeds to Step S161, and determines a path which is not selected to the temporarily selected path in Step S151, as the visual field transition path.

On this other hand, in a case where Vs≥Ve is not satisfied, that is, the subject 101 of the transition destination is faster than the subject 100 of the transition source, the path is selected according to the movement direction of the subject 101. In this case, the movement direction component of the subject 101 is common to the temporarily selected path, and thus, the path generation unit 12 proceeds to Step S162, and determines the temporarily selected path as the visual field transition path.

Note that, in the processing of Steps S155 and S160, the determination of Vs≥Ve is performed, but determination of Vs>Ve may be performed.

In addition, in a case where the movement speed information items Vs and Ve are set to a value of a movement distance between predetermined frames of the subjects 100 and 101, but not the actual speed value, in Steps S155 and S160, Vs≤Ve or Vs<Ve is determined.

In the processing example of FIG. 15 described above, in a case where both of the subjects 100 and 101 are moved, and the movement direction components of both of the subjects 100 and 101 are different from each other, the visual field transition path is determined by using the movement speed information.

Various path determination processings have been described so far, but a processing example other than the described example can be considered. It is obvious that a combination of the path determination processings I to V is also assumed to be used.

That is, it is also considered that the path generation unit 12 specifies the transition source and the transition destination, and then, switches the processing such that in a case where there is no motion in both of the subjects 100 and 101, the processing of Steps S101 to S105 of FIG. 13A is performed, in a case where the subject 100 of the transition source is moved, the processing of Steps S111 and S112 of FIG. 13B is performed, in a case where the subject 101 of the transition destination is moved, the processing of Steps S121 and S122 of FIG. 14A or the processing of FIG. 14B is performed, and in a case where both of the subjects 100 and 101 are moved, the processing of FIG. 15 is performed.

<4. Processing Using Transition Setting Image>

Subsequently, an example will be described in which the information processing device 1 displays a transition setting image representing a plurality of subject regions indicating an existence position of each of a plurality of subjects within the moving image (an existence position which is temporal and is visual within an image of 360 degrees), in a list, and the output target region 90 of the transition source and the output target region 90 of the transition destination are specified on the basis of a selective instruction of the user with respect to the transition setting image.

That is, a visual field transition path determination method using the list display will be described.

The information processing device 1, for example, is capable of generating the transition setting image as illustrated in FIG. 16A by tag information or detection information of the subject reflected on the celestial sphere image, and of displaying the generated image on the display device 6. In the transition setting image, a horizontal axis is time when the subject is reflected, and a vertical axis is a position where the subject is reflected. 0 degrees and 360 degrees of the vertical axis are the same position as a visual field within the image of 360 degrees.

The time of the horizontal axis corresponds to the progress of the frame of the moving image. The position of the vertical axis, for example, is a position represented in a range of 360 degrees in the horizontal direction within the entire image HP.

The transition setting image, for example, represents the existence position of the specific subjects 100, 101, and 102 such as a figure, which are detected by the object detection unit 11. That is, in each of the subjects 100, 101, and 102, the existence position as a position on a time axis and in a range of 360 degrees is perspectively represented, and is displayed in a list. Each of the subjects 100, 101, and 102, for example, is a thumbnail image of the subject. In a case of a figure, a thumbnail image as a face image is considered.

In a case of the example of FIG. 16A, it is illustrated that the subject 100 is in the same position without being moved almost even after time has elapsed.

The subject 101 starts to move after the time point t2.

The subject 102 appears in the entire image HP at the time point t3, and after that, slightly moves the position.

The information processing device 1, for example, such a transition setting image is generated by the display data generation unit 14, and is displayed on the display device 6.

The display data generation unit 14 is capable of generating the transition setting image, on the basis of the detection information of each of the subjects 100, 101, and 102 from the object detection unit 11.

The user is capable of arbitrarily designating a viewpoint movement with respect to the display of the transition setting image.

An example is illustrated in FIG. 16B. For example, the user performs a manipulation of designating a thumbnail image with an oblique line, with respect to each of the subjects 100, 101, and 102. For example, there are the subject 100 at the time point t0, the subject 101 at the time point t3, and the subject 102 at a time point t6.

Accordingly, the information processing device 1 grasps a desired viewpoint movement of the user. That is, the information processing device 1 grasps that in a case where the user instructs that first, a region including the subject 100 is displayed as the output target region 90, the output target region 90 is transitioned to the position of the subject 101 at the time point t3, and the output target region 90 is transitioned to the position of the subject 102 at the time point t6, at the time of reproducing an image from the time point t0.

On the basis of this, the information processing device 1 (the path generation unit 12) sets the transition of the output target region 90 according to the time axis as illustrated by a solid arrow FIG. 16B.

Then, the information processing device 1 sets a cut-out range for each frame according to the setting at the time of reproducing an image, and performs display output with respect to the cut-out range as the output target region 90.

Note that, a time interval of displaying the thumbnail image with respect to each of the subjects 100, 101, and 102 is different according to a reproducing time length of the image contents, the size of the transition setting image, the size of the thumbnail, and the like. For example, the interval of the time points t1, t2 . . . is not limited to correspond to a transition time length at the time of the visual field transition. Accordingly, for example, a time when the visual field transition from the subject 100 to the subject 101 at the time point t3 is started, may be the time point t2, or may be immediately before the time point t3, which is a time point after the time point t2.

The user is capable of setting the transition of the output target region 90 while grasping the position of the subject reflected on the celestial sphere image and the time by seeing such a transition setting image.

According to such designation of the user, the transition from a certain subject to the other subject is set at a certain time point. In such transition, the path generation unit 12 performs the visual field transition path determination processing.

Figure 17:
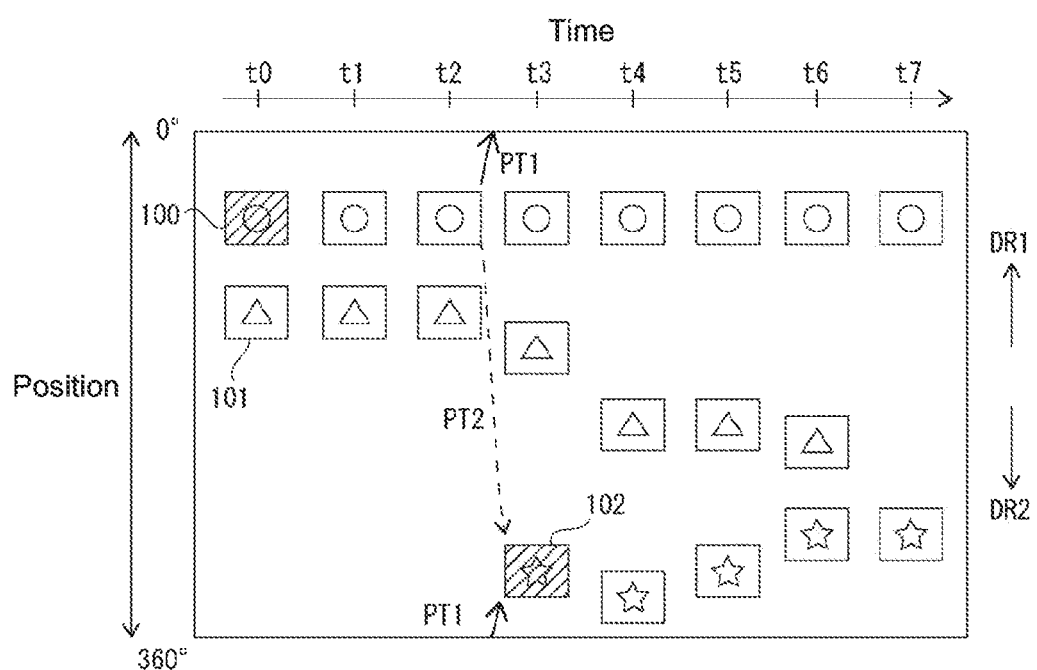
FIG. 17 is an explanatory diagram of visual field transition path determination based on the transition setting image of the embodiment.

An example is illustrated in FIG. 17. In FIG. 17, a case is illustrated in which the transition from the output target region 90 including the subject 100 to the output target region 90 including the subject 102 is designated, at the time point t3.

At this time, the candidate paths PT1 and PT2 are assumed as the visual field transition path. The candidate paths PT1 and PT2, for example, correspond to the paths PT1 and PT2 illustrated in FIG. 6, FIG. 9, FIG. 10, and the like.

In a case of FIG. 17, it is detected that the subject 100 of the transition source is not moved, but the subject 102 of the transition destination is moved. For example, in a case where the visual field transition path is determined by the method described in FIG. 10 (the path determination processing III of FIG. 14A), the subject 102 is moved in the DR2 direction, and thus, the path PT2 on which the transition of the DR2 direction is performed, is set to the visual field transition path.

Figure 18:
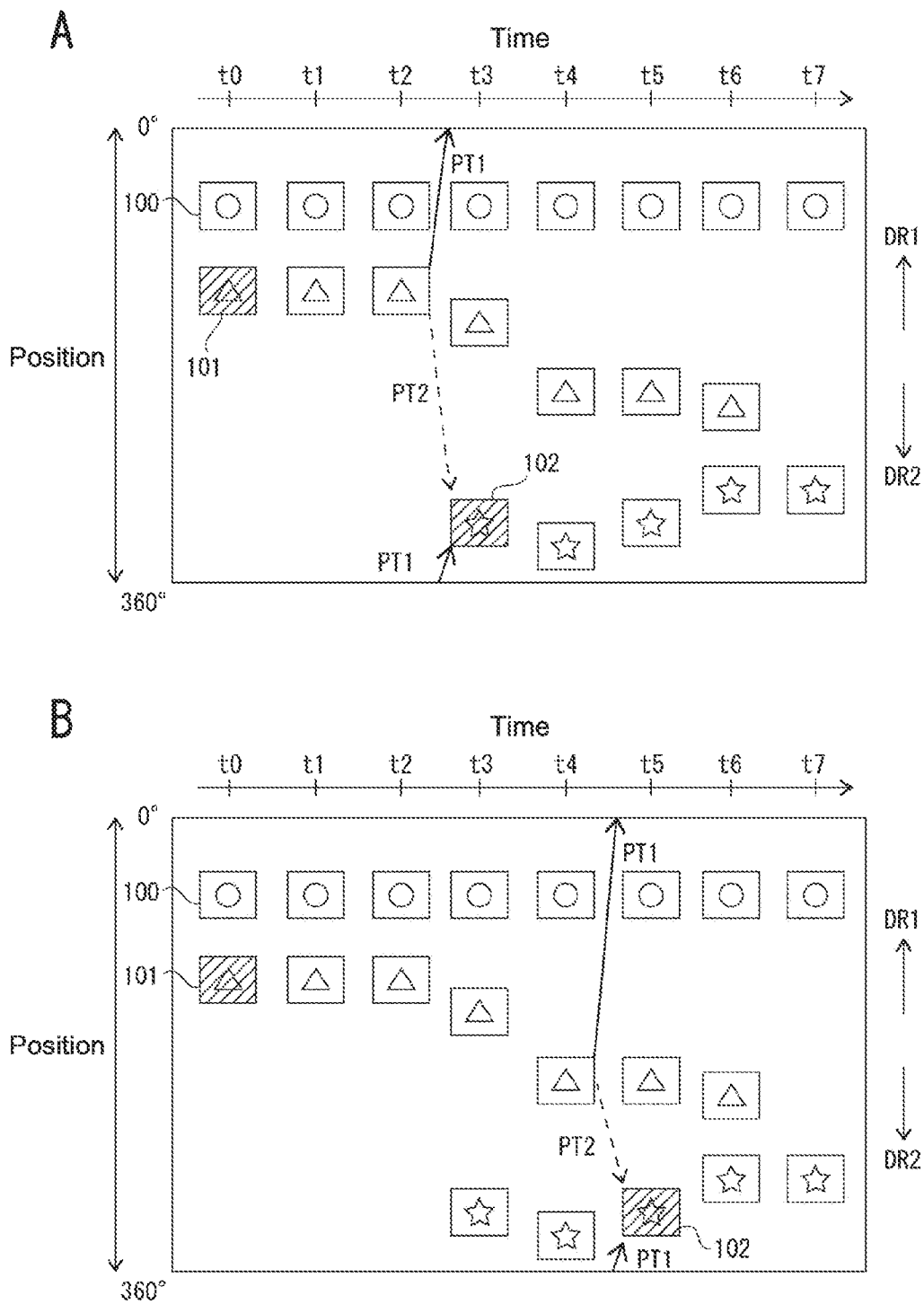
FIG. 18 is an explanatory diagram of the visual field transition path determination based on the transition setting image of the embodiment.

FIG. 18A illustrates a case in which the transition from the output target region 90 including the subject 101 to the output target region 90 including the subject 102 is designated at the time point t3.

At this time, the candidate paths PT1 and PT2 are assumed as the visual field transition path.

In a case of FIG. 18A, it is detected that both of the subject 100 of the transition source and the subject 102 of the transition destination are moved. For example, in a case where the visual field transition path is determined by the path determination processing V of FIG. 15, both of the subjects 101 and 102 are moved in the DR2 direction, and thus, the path PT2 on which the transition of the DR2 direction is performed, is set to the visual field transition path.

FIG. 18B illustrates a case in which the transition from the output target region 90 including the subject 101 to the output target region 90 including the subject 102 is designated at a time point t5.

At this time, the candidate paths PT1 and PT2 are assumed as the visual field transition path.

In a case of FIG. 18B, it is detected that the subject 100 of the transition source is not moved, but the subject 102 of the transition destination is moved.

For example, the visual field transition path is determined by the path determination processing III of FIG. 14A. In this case, the subject 102 is moved in the DR1 direction, and thus, the path PT1 on which the transition of the DR1 direction is performed, is set to the visual field transition path.

Alternatively, in a case of performing processing considering the position of the subject 102 at the time point t5 by using the path determination processing IV, the path PT2 having a shorter movement distance is set to the visual field transition path.

Figure 19:
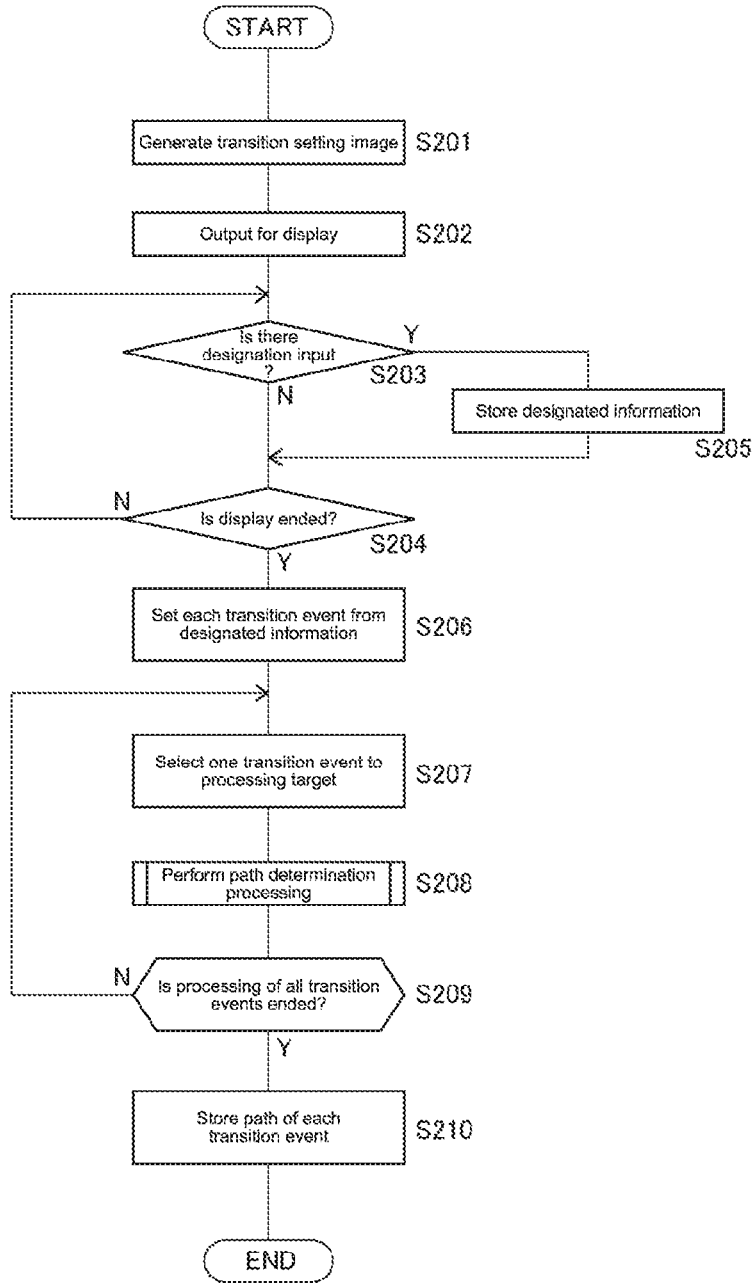
FIG. 19 is a flowchart of processing using the transition setting image of the embodiment.

A processing example of the information processing device 1 using such a transition setting image is illustrated in FIG. 19. The processing of FIG. 19 is processing to be executed by the function of each unit in the information processing device 1 (mainly, the image data acquisition unit 10, the object detection unit 11, the path generation unit 12, the cut-out frame generation unit 13, the display data generation unit 14, the input information acquisition unit 15, and the display control unit 16).

In Step S201, the information processing device 1 generates the display data as the transition setting image. That is, the display data generation unit 14 generates the display data of the transition setting image by using the information of the time and the position with respect to the specific subjects 100, 101, and 102 or the like, detected by the object detection unit 11. Then, in Step S202, the information processing device 1 (the display control unit 16) displays the transition setting image on the display device 6.

During the display of the transition setting image, the information processing device 1 stands by designation input of the user in Step S203, and stands by display end of the transition setting image in Step S204.

The information processing device 1 detects the designation input of the user, for example, the designation manipulation of the thumbnail as illustrated in FIG. 16B by the input information acquisition unit 15, and then, stores the designated information in Step S205.

In addition, the information processing device 1 proceeds to Step S206 from Step S204, at a timing of the user manipulation or the display end of the transition setting image after a predetermined time has elapsed.

In Step S206, the information processing device 1 sets each transition event on the basis of the stored designated information. For example, in a case of the example of FIG. 16B, the transition from the subject 100 to the subject 101 at the time point t3, and the transition from the subject 101 to the subject 102 at the time point t6 are respectively set to the transition event.

In Step S207, one transition event is selected, and is set to a processing target. Then, the visual field transition path in the transition event is determined by the path determination processing of Step S208. That is, in Step S208, processing such as the path selection processings I to V described above, is performed, and the visual field transition path is determined.

In Step S209, it is confirmed whether or not the determination of the visual field transition path with respect to all of the transition events is ended, and in a case where the determination is ended, in Step S207, an unprocessed transition event is selected, and similarly, the visual field transition path is determined.

The determination of the visual field transition path with respect to all of the transition events is ended, and then, the information processing device 1 proceeds to Step S210 from Step S209, and stores the visual field transition of each of the transition events.

Note that, the storage in Step S205 and the storage in Step S210 may be performed in the storage device 3 by the storage control unit 17, or may be performed in the RAM 53 and the storage unit 59 of FIG. 4.

In addition, the information of the visual field transition path stored in Step S210, may be stored by being added to the image data as the meta data. Accordingly, it is possible for a reproducing device to recognize the visual field transition path which is determined in advance with respect to each of the transition events by the meta data, at the time of reproducing, and to perform suitable transition display.

However, in a case where such transition can be designated, it is also assumed that a plurality of transition events occur in a comparatively short period. For example, there is a case where the transition is continuously performed in the manner of Subject 100→Subject 101→Subject 102. In this case, in the process of each transition, the visual line direction is interpolated, and thus, the progressive output target region 90 is cut out and is displayed.

It is considered that three or more points on the spherical surface (for example, the subjects 100, 101, and 102, or the like) are used as a target, and the points are interpolated.

In a case of performing the interpolation of three of more points, it is usually assumed that the interpolation between two points described in FIG. 8 described above is performed between two points.

Figure 20:
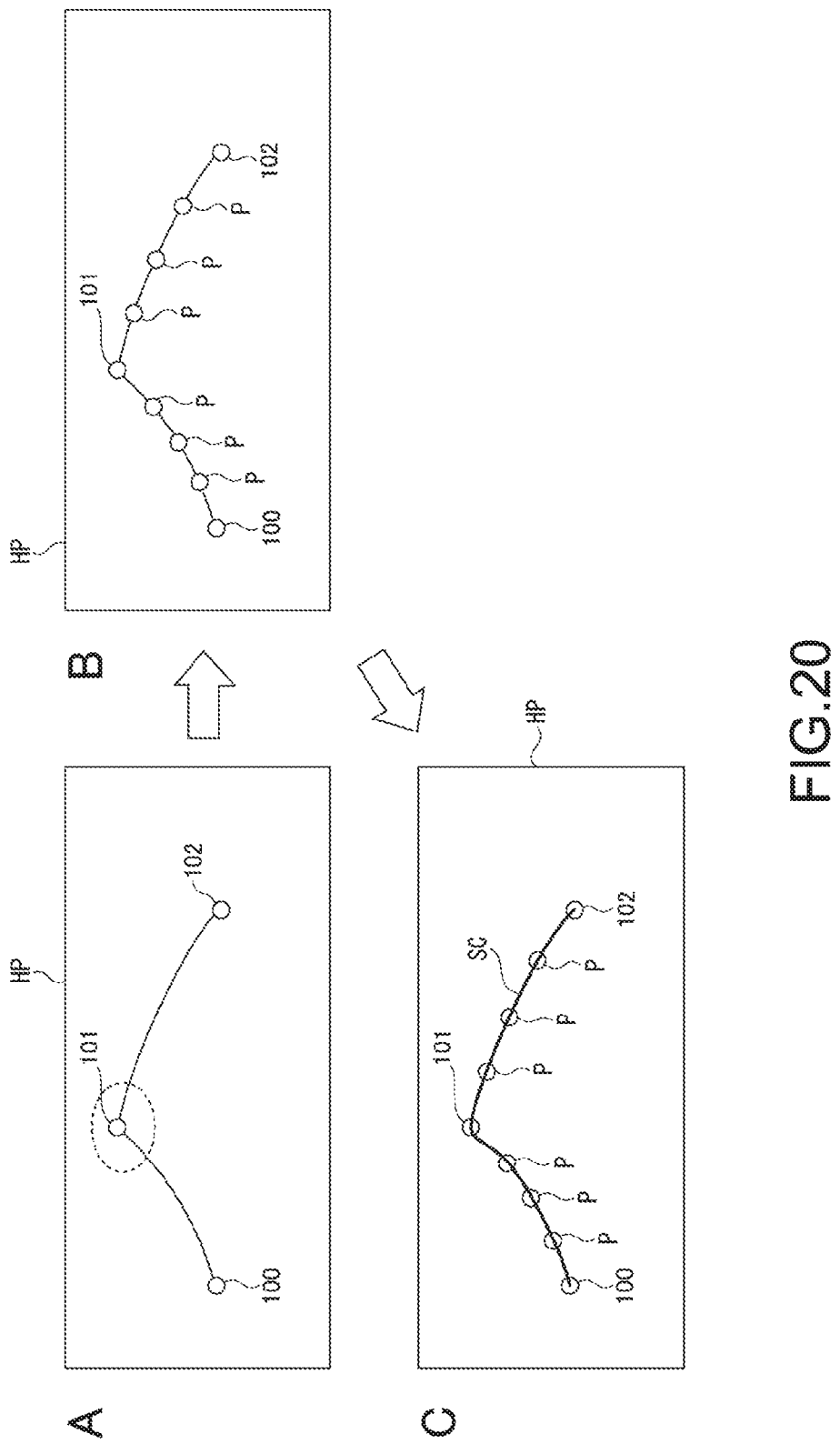
FIG. 20 is an explanatory diagram of interpolation of three or more points of the embodiment.

FIG. 20A illustrates the subjects 100, 101, and 102 in a state where the spherical surface is opened to a plane. In this case, the interpolation between two points is performed between the subjects 100 and 101 and between the subjects 101 and 102. However, in this case, in a coupling portion surrounded by a broken line, an incontinuous visual line direction is switched. At this time, there is a case where the user (the viewer) feels unnatural image transition.

Addition of a control point and spline interpolation are adopted as a method of relaxing such an incontinuous direction switch.

First, as illustrated in FIG. 20B, a control point P is added onto a interpolation curve obtained by the interpolation between two points described above, at regular intervals. For example, the control point P of dividing the interpolation curve into four is described.

Then, the position in the visual line direction as the subjects 100, 101, and 102, and a spline curve completely passing through the control point P are obtained. FIG. 20C illustrates a spline curve SC. It is possible to perform two-dimensional interpolation in a coordinate system where the celestial sphere image is opened to a plane, as a simple example.

According to such a spline curve SC, the visual line direction to be interpolated is set, and the output target region 90 is cut out and is displayed according to each of the visual line directions, and thus, it is possible to perform the transition with a more natural feeling with respect to the visual line movement.

<5. Processing Using Existence Presentation Image>

Subsequently, processing using the existence presentation image will be described.

The information processing device 1 (the display data generation unit 14) generates the display data displaying the existence presentation image presenting a display candidate image existing in the entire image HP, along with the image cut out as the output target region 90.

Then, an example will be described in which in a case where the input information of generating the display candidate image is acquired, the path generation unit 12 sets the output target region 90 being displayed to the transition source, and the information processing device 1 specifies the transition destination on the basis of the input information, and performs the visual field transition path determination.

For example, a candidate region cut out as the output target region 90 is presented to the user, and it is presented that the transition can be performed to the region. Then, in a case where the user selects the region, the transition is performed to the selected region.

FIG. 21A illustrates a display example including the existence presentation image presenting the display candidate image.

The output target region 90 including a certain figure within the entire image HP (a figure on a bike) is cut out and is displayed. In the frame being displayed, the other display candidate (for example, the other figure) exists in the entire image HP, and a thumbnail image 80 of the display candidate image is superimposedly displayed as the existence presentation image.

The display candidate image, for example, is a specific subject detected by the object detection unit 11, such as a figure. Alternatively, the display candidate image may be a subject relevant to the designation manipulation of the user, a subject represented by the meta data which is added to the image data being reproduced, or the like.

The output target region 90 is a partial region of the entire image HP, and the user is not capable of seeing the other region within the entire image HP, and thus, it is presented that the display candidate image exists as the existence presentation image, to the user.

For example, as illustrated in FIG. 21A, in a case where the thumbnail image 80 is set to the existence presentation image with respect to each of the display candidate images, the user is capable of recognizing the contents of the display candidate image (for example, the type of figure). In addition, in a case where the user wants to see the display candidate image, the thumbnail image 80 as the existence presentation image is subjected to the designation manipulation, and thus, it is possible to perform visual field transition of the display.

For example, according to a manipulation of selecting one of three thumbnail images 80 of FIG. 21A, the region of the subject as the display candidate image relevant to the designated thumbnail image 80, is set to the transition destination, and the transition from the output target region 90 of the current subject to the output target region 90 of the subject of the transition destination is performed.

Note that, it has been described that the transition destination from the output target region 90 of the current subject is designated, but it is also considered that the transition source is designated by selecting the thumbnail image 80. For example, the current subject is merely an image for designating the transition source or the transition destination. Then, it is also considered that both of the transition source and the transition destination are designated by the thumbnail image 80, or only the transition source is designated (for example, the current image is set to the transition destination). In a case of each example described below, it is considered that the transition source is designated.

FIG. 21B is an example of presenting the thumbnail image 80 as the existence presentation image according to the time axis of the moving image.

A track bar 81 is displayed on the display of the current output target region 90. In a case where the user touches the track bar 81 with a mouse or the like, the thumbnail image 80 with respect to the subject existing in a frame of a time code corresponding to the position (the display candidate image) is displayed.

A pointing method with respect to the track bar 81 is not limited to a method of using the mouse, a tap manipulation with respect to a screen, or recognition of a hand position in virtual reality (VR) or the like may be performed.

Then, a manipulation of selecting one thumbnail image 80 displayed as described above is performed, and thus, the region of the subject as the display candidate image relevant to the designated thumbnail image 80 is set to the transition destination, and the transition of the output target region 90 from the region of the current subject is performed. In this case, the output target region 90 becomes the output target region 90 of the frame at a time point when the designation is performed by the track bar 81.

In this case, the frame is switched in the time axis direction, and the transition of the time axis direction and the positional transition may be performed simultaneously or sequentially, or a frame in which the subject as the designated display candidate image appears may be searched, and the transition may be temporally and positionally performed to the region of the frame.

FIG. 22A is an example of superimposedly displaying an arrow mark 83 as the existence presentation image, on the display of the output target region 90. The arrow mark 83 presents that the subject as the display candidate image exists in an arrow direction of the celestial sphere image.

As illustrated in FIG. 22B, in a case where the user performs a manipulation of designating a certain arrow mark 83 by a pointer 82 or the like, for example, a manipulation such as mouseover, the information processing device 1 displays the thumbnail image 80 of the subject as the display candidate image existing in a direction illustrated by the arrow mark 83.

In such a state, in a case where the user performs the manipulation of designating the thumbnail image 80, the information processing device 1 sets the region of the subject as the display candidate image relevant to the designated thumbnail image 80, to the transition destination, and executes the transition of the output target region 90 from the region of the current subject.

In this example, the thumbnail image 80 is not displayed at all times, and thus, the screen does not become cumbersome.

FIG. 23A is an example of presenting a radar image 70 as the existence presentation image. The radar image 70, for example, is in the shape of a circle of an image obtained by cutting a sphere, and a mark 71 indicating the subject in the output target region 90 being currently displayed is displayed in a vertically upward direction. That is, the position of the figure on the bike is indicated within a range of 360 degrees range.

In addition, the radar image 70 indicates the position of the subject as the other display candidate image of the current frame by each of marks 72, 73, and 74.

As illustrated in FIG. 23B, in a case where the user performs a manipulation of designating a certain mark 72 by the pointer 82 or the like, the information processing device 1 displays the thumbnail image 80 of the subject as the display candidate image indicated by the mark 72.

In this state, in a case where the user performs the manipulation of designating the thumbnail image 80, the information processing device 1 sets the region of the subject as the display candidate image relevant to the designated thumbnail image 80, to the transition destination, and executes the transition of the output target region 90 from the region of the current subject.

In this example, the thumbnail image 80 is not displayed at all times, and thus, the screen does not become cumbersome.

Figure 24:
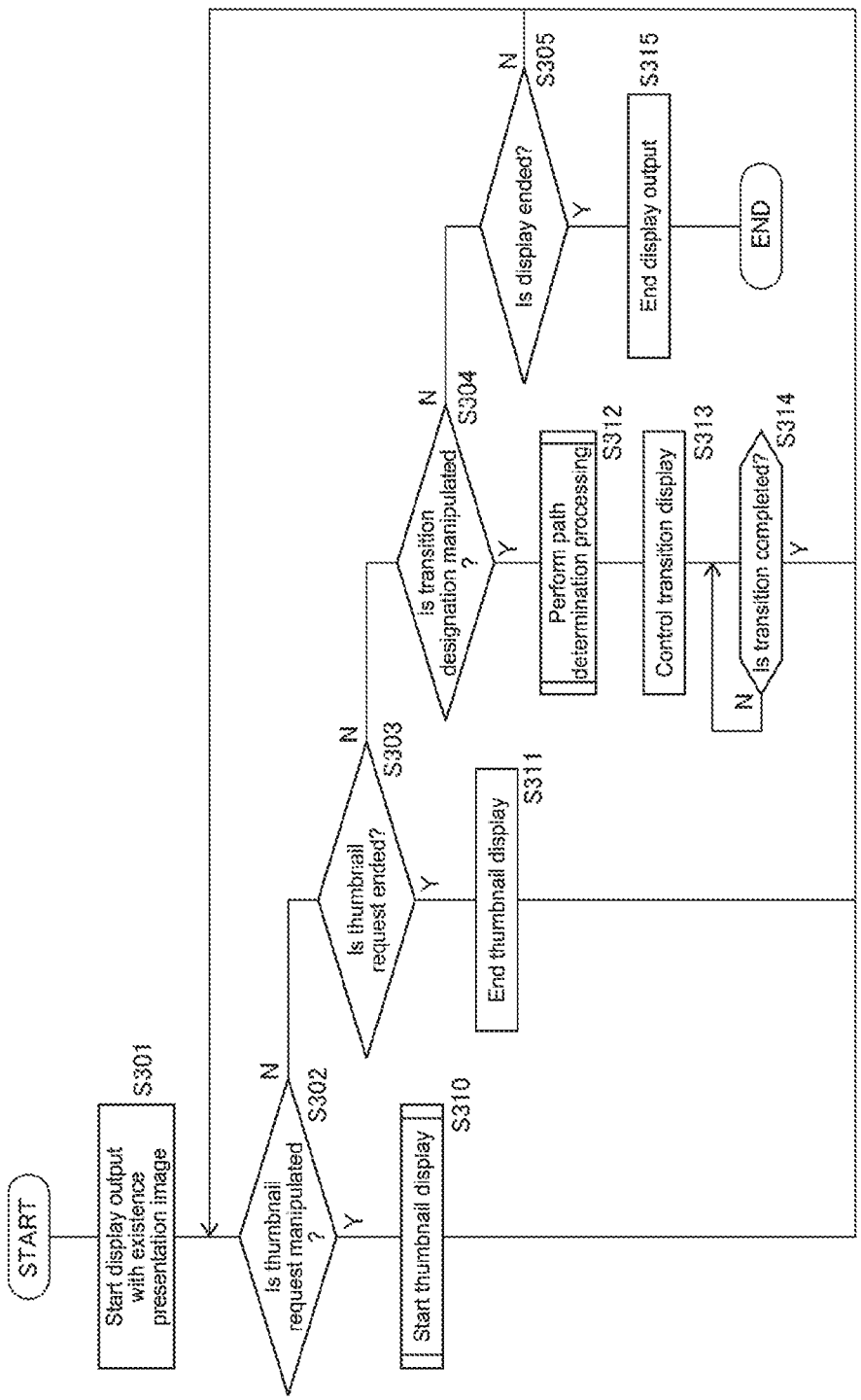
FIG. 24 is a flowchart of processing including displaying of the existence presentation image of the embodiment.

A processing example of the information processing device 1 relevant to the display of the existence presentation image and the visual field transition according to the user designation is illustrated in FIG. 24. The processing of FIG. 24 is processing executed by the information processing device 1 according to each function of FIG. 5A.

In Step S301, the information processing device 1 starts the supply of the display data of the output target region 90 on which the existence presentation image is superimposed, with respect to the display device 6, and starts the display output in the display device 6. For example, display as illustrated in FIG. 22A or FIG. 23A is started.

In Steps S302, S303, S304, and S305, the information processing device 1 monitors the user manipulation or the like according to the function of the input information acquisition unit 15.

For example, in a case where a thumbnail request manipulation such as the designation of the arrow mark 83 of FIG. 22B or the designation of the mark 72 of FIG. 23B is detected, the information processing device 1 proceeds to Step S310, and starts the display of the corresponding thumbnail image 80.

After that, in a case where the thumbnail request manipulation is ended, the information processing device 1 proceeds to Step S311 from Step S303, and ends the display of the thumbnail image 80. For example, as illustrated in FIG. 22B or FIG. 23B, in a state where the thumbnail image 80 is displayed, there is a case where the user moves the position of the pointer 82 to the other position without performing the designation manipulation of the thumbnail image 80.

During the display of the thumbnail image 80, in a case where the manipulation of designating the thumbnail image 80 is detected, the information processing device 1 recognizes the detected manipulation as the designation of the visual field transition with respect to the subject of the display candidate image corresponding to the thumbnail image 80, and proceeds to Step S312 from Step S304.

In Step S312, for example, in any processing of the path determination processings I to V described above, the visual field transition path for the transition from the current output target region 90 to the output target region 90 of the subject designated by the thumbnail image 80, is determined.

Then, in Step S313, the information processing device 1 sequentially outputs the display data of the output target region 90 to which the cut-out region is moved, while performing the interpolation of the visual field direction in the determined path, and thus, executes the visual field transition in the display device 6. In Step S314, at a time point when it is determined that the transition is completed, the transition processing is ended.

In a case where a display end timing is detected by the user manipulation, reproducing end of the display contents as the celestial sphere image, or the like, the information processing device 1 proceeds to Step S315 from Step S305, ends the display output, and ends a set of processings.

According to the processing described above, in a state where it is explicit for the user that there is the other display candidate image, by the existence presentation image, it is possible to display the output target region 90 which is a part of the entire image HP.

Note that, in the processing example described above, cases of FIG. 22 and FIG. 23 are assumed, but as illustrated in FIG. 21A, in a case where the thumbnail image 80 is display as the existence presentation image from the beginning, Steps S302, S303, S310, and S311 of FIG. 24 are not necessary.

In addition, as illustrated in FIG. 21B, in a case where the track bar 81 is displayed, time code designation on the track bar 81 may be considered as the thumbnail request manipulation of Step S302, and the end of the time code designation on the track bar 81 may be considered as thumbnail request end of Step S303.

<6. Conclusion and Modification Example>

In the embodiment described above, the following effects can be obtained.

The information processing device 1 of the embodiment includes the specification unit 21 specifying the output target region 90 of the transition source and the output target region 90 of the transition destination in the output target region 90 which is the partial region of the entire image HP, which is an image having a continuous visual field of 360 degrees in at least one direction, and the visual field transition path determination unit 22 automatically determining the visual field transition path from the output target region 90 of the transition source to the output target region 90 of the transition destination.

In the transition of the output target region 90 imitating the viewpoint movement of the audience, in a case where the transition source and the transition destination in the entire continuous image of 360 degrees are assumed, the visual field transition path from the output target region of the transition source to the output target region of the transition destination as the continuous image can be variously considered. Therefore, the visual field transition path is automatically determined, and thus, visually smooth transition can be provided to the viewer, on the display imitating the viewpoint movement as the transition from the transition source to the transition destination.

In the information processing device 1 of the embodiment, the path generation unit 12 (the visual field transition path determination unit 22) determines one of the candidate path progressing to one direction from the output target region 90 of the transition source towards the output target region 90 of the transition destination within the entire image HP (for example, the path PT1) and the candidate path progressing to the direction opposite to one direction (for example, the path PT2), as the visual field transition path.

In the transition of the output target region, in a case where the transition source and the transition destination are assumed in the entire continuous image of 360 degrees, a plurality of paths transitioned from the transition source to the transition destination as the continuous image are assumed. In particular, in consideration of the position relationship between the transition source and the transition destination in the entire continuous image of 360 degrees, it is considered that the transition from the transition source to the transition destination (the viewpoint movement) is in the direction opposite to one direction on the circumference of 360 degrees of the entire image. One of the plurality of paths is set to be automatically selected. Therefore, in the candidate path progressing to one direction and the candidate path progressing to the direction opposite to one direction, for example, a visually desired path is automatically determined as the visual field transition path.

In particular, it is determined that in which direction transition becomes a more smooth viewpoint movement by comparing transition in one direction to transition in a direction opposite to one direction in a circumference direction, and thus, it is possible to determine a suitable visual field transition path according to comparatively easy processing.

In the transition path determination processings I, II, III, and IV of the embodiment, for example, the movement distance information (D1 and D2) indicating a movement distance from the output target region of the transition source to the output target region of the transition destination on the entire image for each of a plurality of candidate paths, is used in order to determine the visual field transition path.

For example, a path having a shorter movement distance is selected, and thus, it is possible to efficiently present the viewpoint movement from the transition source to the transition destination. It is possible to realize smooth transition which is not visually redundant. For example, the movement distance information is used in order to determine the visual field transition path as described above, and thus, there is a case where a comfortable feeling can be realized at the time of being viewed by the user view.

In the transition path determination processings II and V of the embodiment, in the entire image HP of the moving image, the movement direction information indicating the movement direction in the entire image HP on the progress of the moving image, of the subject 100 existing in the output target region 90 of the transition source, is used in order to determine the visual field transition path.

That is, in the output target region 90 of the transition source, in a case where a figure to be the subject 100 and the other movable body are moved in a certain direction on the moving image, the movement direction is one factor for determining the visual field transition path.

The motion of the subject 100 of the transition source affects the viewpoint of the viewer.

Accordingly, in a case where the viewpoint is moved from the transition source to the transition destination, the visual field transition path at the time of transition is determined in consideration of the movement direction of the subject 100 of the transition source, which has been seen so far, and thus, the viewer is capable of feeling a smooth viewpoint movement.

In the transition path determination processings III, IV, and V of the embodiment, the movement direction information indicating the movement direction within the entire image HP on the progress of the moving image, of the subject 101 existing in the output target region 90 of the transition destination, is used in order to determine the visual field transition path.

That is, in the output target region 90 of the transition destination, in a case where the figure to be the subject 101 and the other movable body are moved in a certain direction on the moving image, the movement direction is one factor for determining the visual field transition path.

The fact that the motion of the subject affects the viewpoint of the viewer, also applies to the subject 101 of the transition destination. In a case where the viewpoint is moved from the transition source to the transition destination, the visual field transition path at the time of transition is determined in consideration of the movement direction of the subject 101 of the transition destination, which appears according to the transition, and thus, the viewer is capable of feeling a smooth viewpoint movement.

In the transition path determination processing V of the embodiment, the movement speed information (Vs and Ve) indicating the movement speed within the entire image HP on the progress of the moving image, of the subject 101 existing in the output target region 90 of the transition destination or the subject 100 existing in the output target region 90 of the transition source, is used in order to determine the visual field transition path.

That is, in a case where one or both of the images of each of the transition source and the transition destination (the figure to be the subject and the other movable body) are moved on the moving image, the movement speed is one factor for determining the visual field transition path.

The motion of the subjects 100 and 101 affects the viewpoint movement of the viewer, and in particular, the condition of an influence on the viewpoint is different according to a fast motion and a slow motion. Therefore, the visual field transition path at the time of transition is determined in consideration of the movement speed of the subjects 100 and 101, and thus, it is possible to realize transition of allowing the viewer to feel a smooth viewpoint movement.

In the transition path determination processing IV of the embodiment, the subject position information indicating the position of the subject 101 existing in the output target region 90 of the transition destination in the frame after the required transition time has elapsed, is used in order to determine the visual field transition path.

In continuous transition from the transition source to the transition destination (the viewpoint movement), a transition time is required. In a case where there is a motion in the subject of the transition destination, it is assumed that the position of the subject within the entire image after the required transition time, is different from the position in the frame at the transition start time point. Therefore, the visual field transition path is determined in consideration of the position of the subject of the transition destination when the required transition time has elapsed.

Accordingly, it is possible to realize transition of allowing the viewer to feel a smooth viewpoint movement on the assumption of the motion of the subject 101 of the transition destination.

Figure 16:
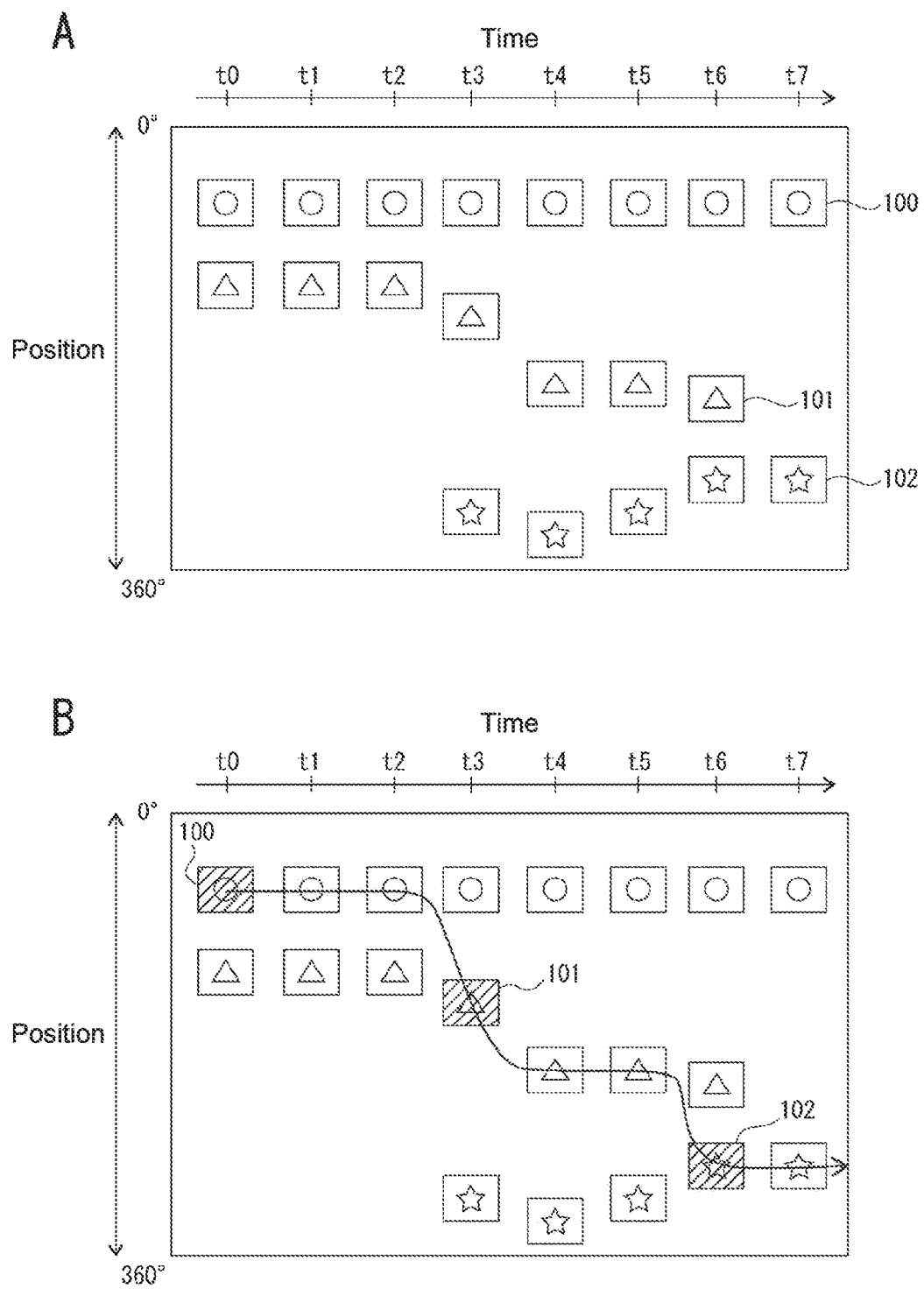
FIG. 16 is an explanatory diagram of a transition setting image of the embodiment.

In the embodiment, the display or the transition setting of the transition setting image described in FIG. 16 or the like can be performed. That is, the information processing device 1 presents the transition setting image representing the plurality of subject regions indicating the existence position within the moving image of each of the plurality of subjects, which are the partial region included in the moving image, with respect to the entire image HP as the moving image, in a list, to the user. Then, the information processing device 1 (the path generation unit 12) specifies the output target region 90 of the transition source and the output target region 90 of the transition destination, on the basis of the selective instruction of the user (refer to FIG. 19).

That is, it is possible to display the positions of each of the subjects within the entire image at each time point in a list with respect to the user who is the viewer of the image, and for example, to select the subject. Accordingly, the movement of the output target region according to the progress of the moving image, that is, the viewpoint movement is performed, and thus, it is possible to present the subject that the user wants to see, while performing the viewpoint movement.

In this case, the visual field transition path at the time of the transition between the subjects (the viewpoint movement) is suitably determined, and thus, the user is capable of feeling a smooth and natural viewpoint movement.

In addition, the user is capable of setting a viewing field angle by the transition setting image, while perspectively viewing the entire celestial sphere video, and thus, a viewing path considering the position relationship of the subjects and the time is easily set.

In the embodiment, as illustrated in FIG. 21 to FIG. 24, the processing using the existence presentation image is performed. That is, the information processing device 1 includes the display data generation unit 14 generating the display data displaying the image of the partial region which is the output target region 90 within the entire image HP, and the existence presentation image (80, 81, 83, 70, and the like) presenting the display candidate image existing in the still image or the moving image as the entire image HP. In addition, the information processing device 1 includes the input information acquisition unit 15 acquiring the input information of designating the display candidate image, which is performed with respect to the display based on the display data. Then, the path generation unit 12 (the specification unit 21) specifies the output target region 90 of the transition destination or the output target region 90 of the transition source, on the basis of the user manipulation of designating the display candidate image, which is performed with respect to the display based on the display data including the image of the partial region which is the output target region within the entire image, and the existence presentation image presenting the display candidate image existing in the still image or the moving image as the entire image (Step S312 of FIG. 24).

That is, the existence of the subject of the other display candidate is presented on the image being displayed as the existence presentation image. Then, the user performs the manipulation of selecting a certain display candidate image by the manipulation with respect to the existence presentation image, or the like, and thus, the image display such as the viewpoint movement to the region including the display candidate image, is realized.

In this case, the visual field transition path at the time of the transition from the region being currently displayed to the region of the display candidate image (the viewpoint movement) is suitably determined, and thus, the user is capable of feeling a smooth and natural viewpoint movement.

In addition, actually, the subject as the display candidate image has various sizes. In the embodiment, the subject is presented as the thumbnail image 80 of the same size. Accordingly, it is possible to equivalently confirm the respective display candidates, and to accelerate free selection of the user. In addition, it is possible prevent the display candidate from being presented as a needlessly large image and the image of the current output target region 90 from being disturbed as much as possible.

Figure 21:
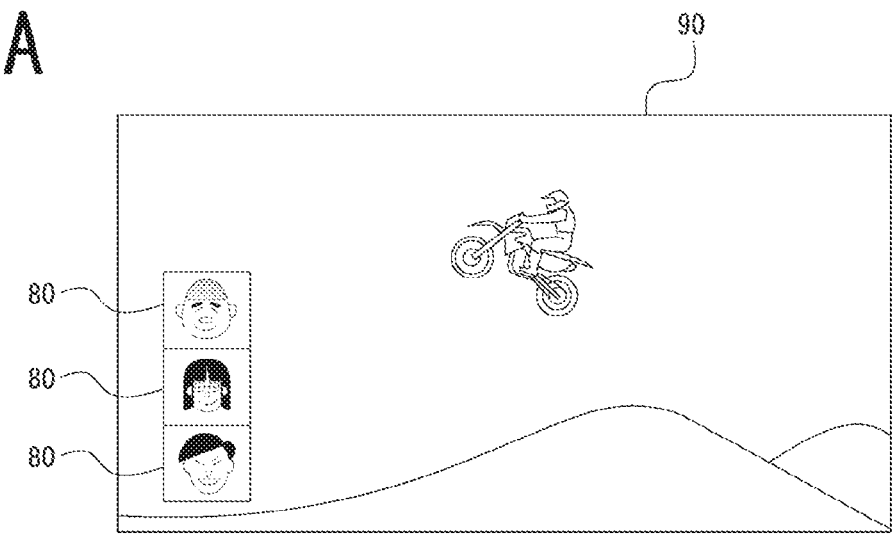
FIG. 21 is an explanatory diagram of designation input using an existence presentation image of the embodiment.
Figure 21:
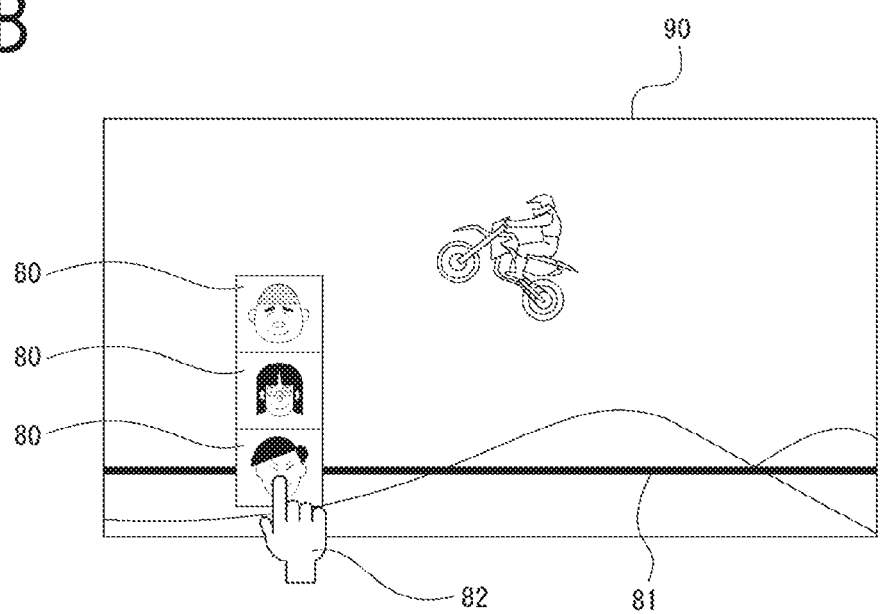
Figure 22:
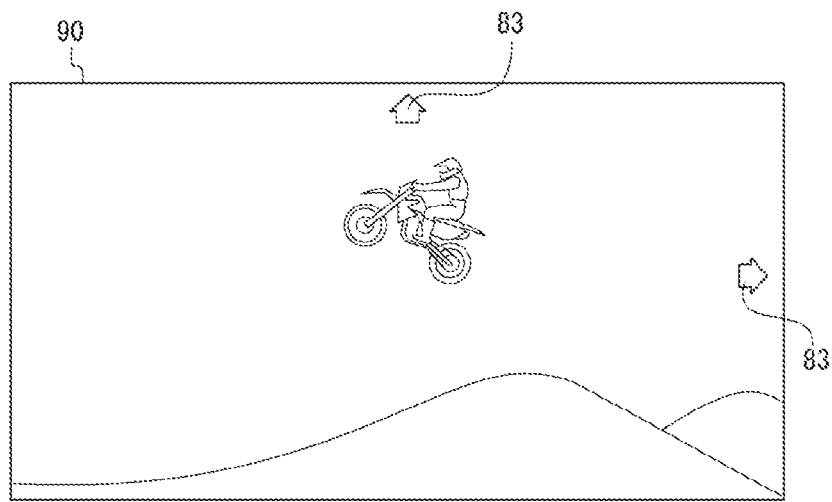
FIG. 22 is an explanatory diagram of the designation input using the existence presentation image of the embodiment.
Figure 22:
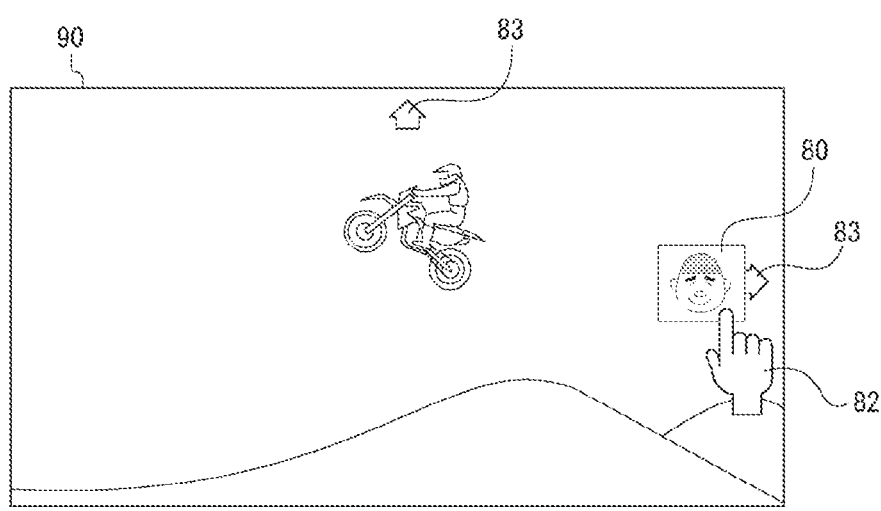
Figure 23:
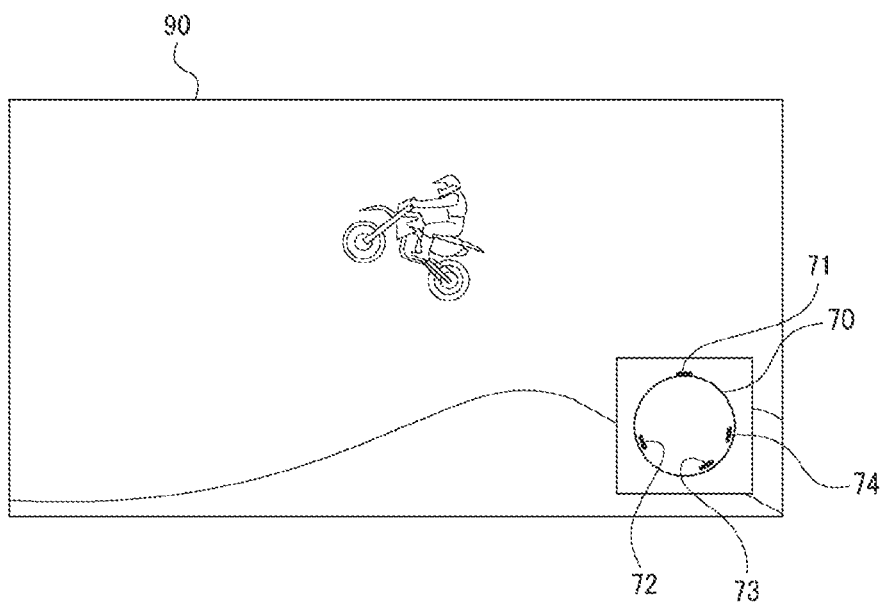
FIG. 23 is an explanatory diagram of the designation input using the existence presentation image of the embodiment.
Figure 23:
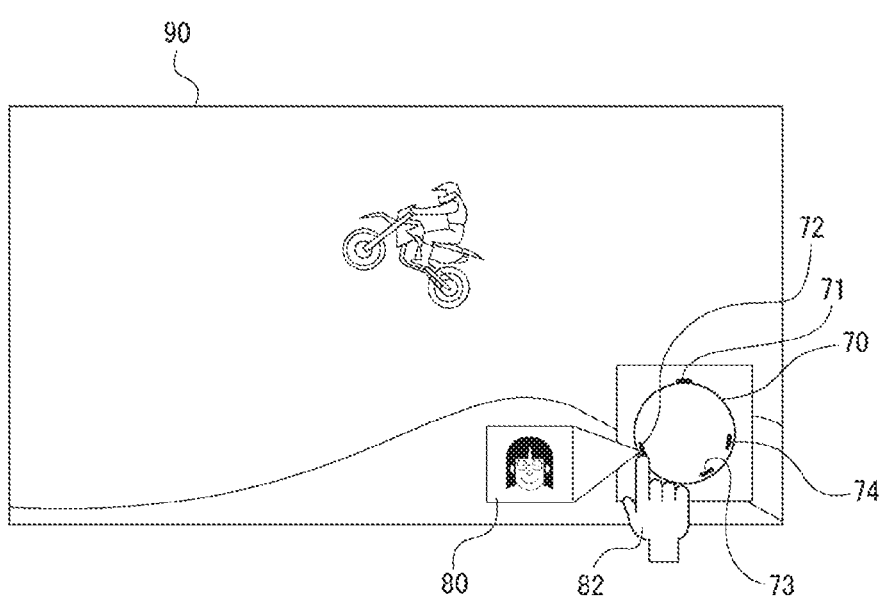

In the embodiment, the thumbnail image 80 of the display candidate image is set to the existence presentation image, and one or a plurality of thumbnail images 80 is displayed along with the image of the current output target region 90 (refer to FIG. 21 to FIG. 23).

That is, existence presentation is performed by a method of superimposing the existing display candidate image, for example, on a part of the current output target region as the thumbnail image 80 of a uniform size, or the like. Accordingly, the user is capable of easily recognizing that there are other notable images, or the image contents, and for example, also easily understands the manipulation for the viewpoint movement.

In the embodiment, an example is described in which the existence presentation image is set to an image which is displayed in the position according to the position relationship with respect to the current output target region 90 of the display candidate image indicated by the existence presentation image, on the display image of the current output target region 90 (refer to FIG. 22 and FIG. 23).

For example, the existence presentation image with respect to the display candidate image existing in the upper portion on the screen with respect to the current output target region 90, is presented in the upper portion on the current screen as with the arrow mark 83 of FIG. 22. Similarly, the existence presentation image with respect to the display candidate image existing in the right portion on the screen with respect to the current output target region 90, is presented in the right portion on the current screen as with the arrow mark 83.

Accordingly, the user is capable of easily recognize the position relationship of the display candidate image from the current image. Here, a case of an image of 360 degrees is described, and thus, for example, the display candidate image to be in the right portion, can be continuously transitioned from the left side. Therefore, it is suitable that the position relationship indicates a closer one in the right portion and the left portion.

In addition, the thumbnail image 80 is displayed according to the designation of the arrow mark 83, and thus, it is possible for the user to easily discriminate the subject existing in the corresponding position, and to easily select desired visual field transition.

Further, the thumbnail image 80 is not displayed at all times, and thus, it is possible to provide a comfortable viewing environment without making the screen cumbersome.

In the embodiment, as illustrated in FIG. 21B, an example is described in which the thumbnail image 80 as the existence presentation image is displayed corresponding to the time axis position of the moving image contents of the display candidate image (a position on the track bar 81) to which the existence presentation image corresponds.

In a case of the moving image contents, each existence state of the display candidate image varies in the time axis direction. Therefore, it is possible to confirm the existence of the display candidate image on the time axis.

Accordingly, the user easily recognizes the existence of each display candidate image on the time axis. Then, the reflected object is easily grasped without being limited to the same time as that of the frame being viewed, and variousness of the designation of the transition destination and easiness of the transition designation with respect to the temporal direction can be applied to the user.

In the information processing device according to the present technology described above, it is considered that the display data generation unit generates the display data including the existence presentation image indicating the position relationship between the display candidate image and the current output target region.

For example, an image indicating a relative position of the display candidate image with respect to the current output target region 90 by the marks 71, 72, 73, and 74 on the radar image 70 of FIG. 23 is set to the existence presentation image.

Accordingly, the user is capable of more easily and obviously recognizing the position relationship of each of the display candidate images. Accordingly, the transition imitating the viewpoint movement is also felt with a more uncomfortable feeling.

In addition, the thumbnail image 80 is displayed according to the designation of the marks 72, 73, and 74, or the like, and thus, it is possible for the user to easily discriminate the subject existing in the position, and to easily select desired visual field transition.

Further, the thumbnail image 80 is not displayed at all times, and thus, it is possible to provide a comfortable viewing environment without making the screen cumbersome.

A program of the embodiment is a program of allowing the information processing device to execute a specification procedure of specifying the output target region 90 of the transition source and the output target region 90 of the transition destination in the output target region 90 which is the partial region of the entire image HP, which is the image having a continuous visual field of 360 degrees in at least one direction, and a visual field transition path determination procedure of automatically determining the visual field transition path from the output target region 90 of the transition source to the output target region 90 of the transition destination. For example, the program is a program of allowing an information processing device (a microcomputer, a digital signal processor (DSP), or the like) to execute the processing of FIG. 13A, FIG. 13B, FIG. 14A, FIG. 14B, FIG. 15, FIG. 19, FIG. 24, and the like is a program.

According to the program, an arithmetic processing device having a function as the information processing device 1 of the embodiment can be realized.

Such a program can be recorded in various recording mediums. In addition, the program can be recorded in advance in an HDD as a recording medium which is embedded in a device such as a computer device, a ROM in a microcomputer including a CPU, and the like. In addition, the program can be temporarily or permanently recorded in a removable recording medium such as a semiconductor memory, a memory card, an optical disk, a magnetooptical disk, and a magnetic disk. In addition, such a removable recording medium can be provided as so-called package software.

In addition, such a program can be installed in a personal computer or the like from a removable recording medium, or can be downloaded from a download site through a network such as a LAN and the Internet.

The present technology is not limited to the examples of the embodiment or the modification example or the like described in the embodiment, and more various modification examples are assumed.

The information of the visual field transition path determined in the transition path determination processing is used as the display control of the time point, and it is also considered that the information is stored corresponding to the image data, or is added to the image data as the meta data, and thus, can be used even at the time of reproducing later.

In addition, it is also assumed that determination information of the visual field transition path is transmitted to the external device.

In addition, in the path determination processing of the embodiment, selecting one path after calculating the candidate path is described as the processing example, but the final visual field transition path may be directly determined without calculating the candidate path. For example, in a case where the visual field transition path is determined by using the motion direction of the subject, it is possible to determine the final visual field transition path according to the movement direction of the subject, without performing processing of obtaining a plurality of candidate paths.

As described above, it is not necessary that the information processing device 1 is configured of one device. A part of the function of the information processing device 1 of the embodiment may be executed in the other information processing device connected to the system, or may be executed in the external information processing device by so-called cloud computing.

Note that, the effects described herein are merely an example, but the present technology is not limited thereto, and other effects may be obtained.

Note that, the present technology is also capable of adopting the following configurations.

(1) An information processing device, including:
a specification unit that specifies a transition source output target region and a transition destination output target region, as an output target region which is a partial region of an entire image, which is an image including a continuous visual field of 360 degrees in at least one direction; and a visual field transition path determination unit that automatically determines a visual field transition path from the transition source output target region to the transition destination output target region.

(2) The information processing device according to (1) described above, in which the visual field transition path determination unit determines one of a candidate path progressing to one direction from the transition source output target region towards the transition destination output target region, and a candidate path progressing to a direction opposite to the one direction, as the visual field transition path.

(3) The information processing device according to (1) or (2) described above, in which the visual field transition path determination unit uses movement distance information indicating a movement distance from the transition source output target region to the transition destination output target region for each of a plurality of candidate paths, in order to determine the visual field transition path.

(4) The information processing device according to any one of (1) to (3) described above, in which the entire image is a moving image, and the visual field transition path determination unit uses movement direction information indicating a movement direction in the entire image of a subject existing in the transition source output target region on progress of the moving image, in order to determine the visual field transition path.

(5) The information processing device according to any one of (1) to (4) described above, in which the entire image is a moving image, and the visual field transition path determination unit uses movement direction information indicating a movement direction in the entire image of a subject existing in the transition destination output target region on progress of the moving image, in order to determine the visual field transition path.

(6) The information processing device according to any one of (1) to (5) described above, in which the entire image is a moving image, and the visual field transition path determination unit uses movement speed information indicating a movement speed in the entire image of a subject existing in the transition destination output target region or a subject existing in the transition source output target region on progress of the moving image, in order to determine the visual field transition path.

(7) The information processing device according to any one of (1) to (6) described above, in which the entire image is a moving image, and the visual field transition path determination unit uses subject position information indicating a position of a subject existing in the transition destination output target region in a frame after a required transition time has elapsed, in order to determine the visual field transition path.

(8) The information processing device according to any one of (1) to (7) described above, in which the entire image is a moving image, and the specification unit specifies the transition source output target region and the transition destination output target region, on a basis of a selective instruction of a user with respect to a transition setting image representing a plurality of subject regions each of which is a partial region included in the moving image and indicates an existence position of each of a plurality of subjects in the moving image, in a list.

(9) The information processing device according to any one of (1) to (8) described above, in which the specification unit specifies the transition destination output target region or the transition source output target region, on a basis of a user manipulation of designating a display candidate image, that is performed with respect to a display based on display data including an image of a partial region to be the output target region in the entire image and an existence presentation image representing a display candidate image existing in a still image or a moving image as the entire image.

(10) The information processing device according to (9) described above, in which the existence presentation image is a thumbnail image of the display candidate image, and the display data includes an image of a current output target region and a thumbnail image of the display candidate image.

(11) The information processing device according to (9) or (10) described above, in which the existence presentation image is provided at a position corresponding to a position relationship of the display candidate image indicated by the existence presentation image with respect to the image of the partial region.

(12) The information processing device according to any one of (9) to (11) described above, in which the display data includes an existence presentation image corresponding to a display candidate image existing in a designated time axis position, that corresponds to the time axis position designated in the image of the partial region to be the output target region.

(13) The information processing device according to any one of (9) to (12) described above, in which the display data includes an existence presentation image indicating a position relationship between the display candidate image and the image of the partial region to be the output target region.

(14) An information processing method executed by an information processing device, the method including:

a specification step of specifying a transition source output target region and a transition destination output target region, in an output target region which is a partial region of an entire image, which is an image including a continuous visual field of 360 degrees in at least one direction; and a visual field transition path determination step of automatically determining a visual field transition path from the transition source output target region to the transition destination output target region.

(15) A program that causes an information processing device to execute:

a specification step of specifying a transition source output target region and a transition destination output target region, in an output target region which is a partial region of the entire image, which is an image having a continuous visual field of 360 degrees in at least one direction; and a visual field transition path determination step of automatically determining a visual field transition path from the transition source output target region to the transition destination output target region.

REFERENCE SIGNS LIST

1 information processing device
2 image pickup device 3 storage device
4 communication device
5 manipulation device
6 display device
10 image data acquisition unit
11 object detection unit
12 path generation unit
13 cut-out frame generation unit
14 display data generation unit
15 input information acquisition unit
16 display control unit
17 storage control unit
18 communication control unit
21 specification unit
22 visual field transition path determination unit
90 output target region
100,101 subject

The invention claimed is:

1. An information processing device, comprising:
an electronic processor; and
a memory comprising instructions that, when executed by the electronic processor cause the electronic processor to perform a set of operations including
specifying a transition source output target region and a transition destination output target region, as an output target region which is a partial region of an entire image, which is an image including a continuous visual field of 360 degrees in at least one direction; and
automatically determining a visual field transition path from the transition source output target region to the transition destination output target region,
wherein automatically determining the visual field transition path from the transition source output target region to the transition destination output target region further includes
performing an image analysis with respect to the entire image,
detecting a specific object existing in the transition source output target region to be a first subject based on the image analysis with respect to the entire image, and
detecting a specific object existing in the transition destination output target region to be a second subject based on the image analysis with respect to the entire image.

2. The information processing device according to claim 1, wherein the set of operations further includes
determining one of a candidate path progressing to one direction from the transition source output target region towards the transition destination output target region, and a candidate path progressing to a direction opposite to the one direction, as the visual field transition path.

3. The information processing device according to claim 1, wherein determining the visual field transition path is based on movement distance information indicating a movement distance from the transition source output target region to the transition destination output target region for each of a plurality of candidate paths.

4. The information processing device according to claim 1, wherein
the entire image is a moving image, and
determining the visual field transition path is based on movement direction information indicating a movement direction in the entire image of the first subject existing in the transition source output target region on progress of the moving image.

5. The information processing device according to claim 1, wherein
the entire image is a moving image, and
determining the visual field transition path is based on movement direction information indicating a movement direction in the entire image of the second subject existing in the transition destination output target region on progress of the moving image.

6. The information processing device according to claim 1, wherein
the entire image is a moving image, and
determining the visual field transition path is based on movement speed information indicating a movement speed in the entire image of the second subject existing in the transition destination output target region or the first subject existing in the transition source output target region on progress of the moving image.

7. The information processing device according to claim 1, wherein
the entire image is a moving image, and
determining the visual field transition path is based on subject position information indicating a position of the second subject existing in the transition destination output target region in a frame after a required transition time has elapsed.

8. The information processing device according to claim 1, wherein
the entire image is a moving image, and
specifying the transition source output target region and the transition destination output target region, on a basis of a selective instruction of a user with respect to a transition setting image representing a plurality of subject regions each of which is the partial region included in the moving image and indicates an existence position of each of a plurality of subjects in the moving image, in a list.

9. The information processing device according to claim 1, wherein
specifying the transition source output target region and the transition destination output target region further includes specifying the transition destination output target region or the transition source output target region, on a basis of a user manipulation of designating a display candidate image, that is performed with respect to a display based on display data including an image of the partial region to be the output target region in the entire image and an existence presentation image representing the display candidate image existing in a still image or a moving image as the entire image.

10. The information processing device according to claim 9, wherein
the existence presentation image is a thumbnail image of the display candidate image, and
the display data includes an image of a current output target region and a thumbnail image of the display candidate image.

11. The information processing device according to claim 9, wherein
the existence presentation image is provided at a position corresponding to a position relationship of the display candidate image indicated by the existence presentation image with respect to the image of the partial region.

12. The information processing device according to claim 9, wherein
the display data includes the existence presentation image corresponding to the display candidate image existing in a designated time axis position, that corresponds to the time axis position that is designated in the image of the partial region to be the output target region.

13. The information processing device according to claim 9, wherein
the display data includes the existence presentation image indicating a position relationship between the display candidate image and the image of the partial region to be the output target region.

14. An information processing method executed by an information processing device, the method comprising:
specifying, with an electronic processor of the information processing device, a transition source output target region and a transition destination output target region, in an output target region which is a partial region of an entire image, which is an image including a continuous visual field of 360 degrees in at least one direction; and
automatically determining, with the electronic processor, a visual field transition path from the transition source output target region to the transition destination output target region,
wherein automatically determining the visual field transition path from the transition source output target region to the transition destination output target region further includes
performing an image analysis with respect to the entire image,
detecting a specific object existing in the transition source output target region to be a first subject based on the image analysis with respect to the entire image, and
detecting a specific object existing in the transition destination output target region to be a second subject based on the image analysis with respect to the entire image.

15. A non-transitory computer-readable medium comprising a program that, when executed by an electronic processor, causes the electronic processor to perform a set of operations comprising:
specifying a transition source output target region and a transition destination output target region, in an output target region which is a partial region of an entire image, which is an image including a continuous visual field of 360 degrees in at least one direction; and
automatically determining a visual field transition path from the transition source output target region to the transition destination output target region,
wherein automatically determining the visual field transition path from the transition source output target region to the transition destination output target region further includes
performing an image analysis with respect to the entire image,
detecting a specific object existing in the transition source output target region to be a first subject based on the image analysis with respect to the entire image, and
detecting a specific object existing in the transition destination output target region to be a second subject based on the image analysis with respect to the entire image.

16. The non-transitory computer-readable medium according to claim 15, wherein the set of operations further includes
determining one of a candidate path progressing to one direction from the transition source output target region towards the transition destination output target region, and a candidate path progressing to a direction opposite to the one direction, as the visual field transition path.

17. The non-transitory computer-readable medium according to claim 15, wherein determining the visual field transition path is based on movement distance information indicating a movement distance from the transition source output target region to the transition destination output target region for each of a plurality of candidate paths.

18. The non-transitory computer-readable medium according to claim 15, wherein
the entire image is a moving image, and
determining the visual field transition path is based on movement direction information indicating a movement direction in the entire image of the first subject existing in the transition source output target region on progress of the moving image.

19. The non-transitory computer-readable medium according to claim 15, wherein
the entire image is a moving image, and
determining the visual field transition path is based on movement direction information indicating a movement direction in the entire image of the second subject existing in the transition destination output target region on progress of the moving image.

20. The non-transitory computer-readable medium according to claim 15, wherein
the entire image is a moving image, and
determining the visual field transition path is based on movement speed information indicating a movement speed in the entire image of the second subject existing in the transition destination output target region or the first subject existing in the transition source output target region on progress of the moving image.

* * * * *